United States Patent [19]
Whittlesey

[11] Patent Number: 4,517,261
[45] Date of Patent: May 14, 1985

[54] HYDROGEN GAS RELIEF VALVE

[75] Inventor: Curtis C. Whittlesey, Birmingham, Mich.

[73] Assignee: Energy Development Associates, Inc., Madison Hgts., Mich.

[21] Appl. No.: 510,401

[22] Filed: Jul. 1, 1983

[51] Int. Cl.³ .................................................. H01M 2/12
[52] U.S. Cl. ........................................ 429/64; 429/76; 429/53
[58] Field of Search ................... 429/17, 19, 64, 105, 429/76, 6, 53

[56] References Cited

U.S. PATENT DOCUMENTS

| | | | |
|---|---|---|---|
| 3,497,396 | 2/1970 | Goodwin | 429/53 |
| 4,413,040 | 11/1983 | Carr | 429/64 |
| 4,413,042 | 11/1983 | Carr | 429/105 |
| 4,423,121 | 12/1983 | Hammond et al. | 429/105 |

OTHER PUBLICATIONS

"Development of High-Efficiency Cost-Effective, Zinc-Chlorine Batteries for Utility Peak-Shaving", 1976, EM-711, Research Projects 226-2 and 226-1-2, Interim Report, Mar. 1978, EDA.
Energy Conservation, "Cos Analysis of 50 KWH Zinc-Chlorine Batteries for Mobile Applications", Jan. 1978, work performed under Contract No. EY-76-C-0-2-2966, EDA, U.S. Department of Energy, reproduced by National Technical Information Service.
EDA, "EPRI-DOE-EDA Load-Leveling Program Review", May 28, 1980 P.M.

Primary Examiner—Donald L. Walton
Attorney, Agent, or Firm—Harness, Dickey & Pierce

[57] ABSTRACT

An improved battery stack design for an electrochemical system having at least one cell from which a gas is generated and an electrolyte in communication with the cell is described. The improved battery stack design features means for defining a substantially closed compartment for containing the battery cells and at least a portion of the electrolyte for the system, and means in association with the compartment means for selectively venting gas from the interior of the compartment means in response to the level of the electrolyte within the compartment means. The venting means includes a relief valve having a float member which is actuated in response to the level of the electrolyte within the compartment means. This float member is adapted to close the relief valve when the level of the electrolyte is above a predetermined level and open the relief valve when the level of electrolyte is below this predetermined level.

9 Claims, 22 Drawing Figures

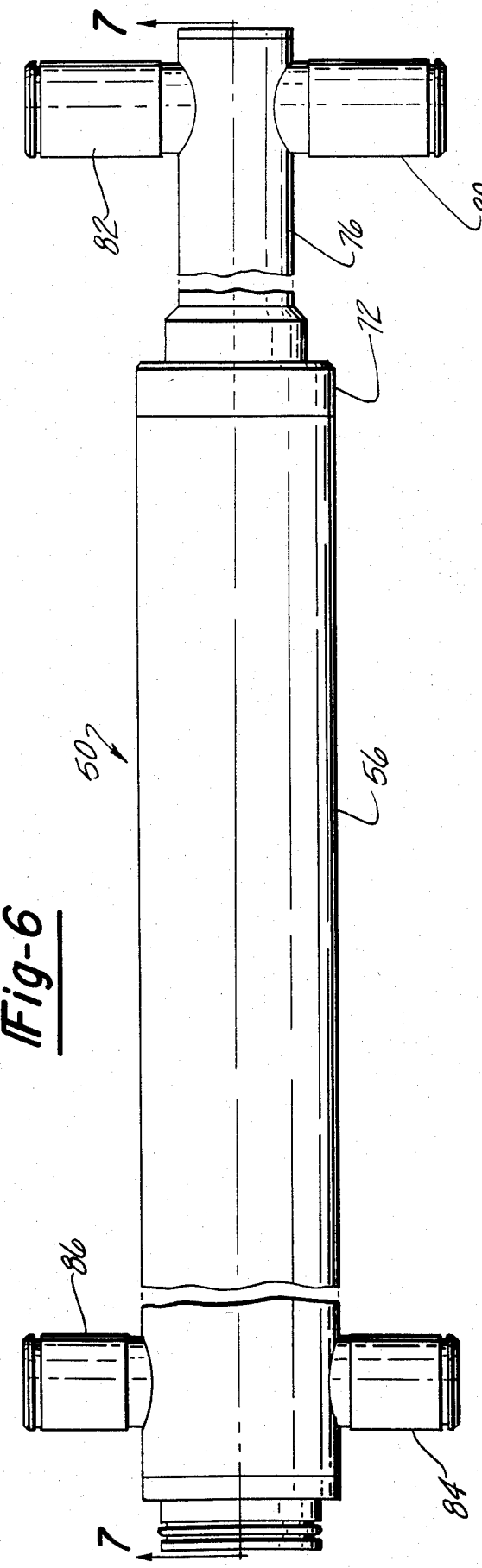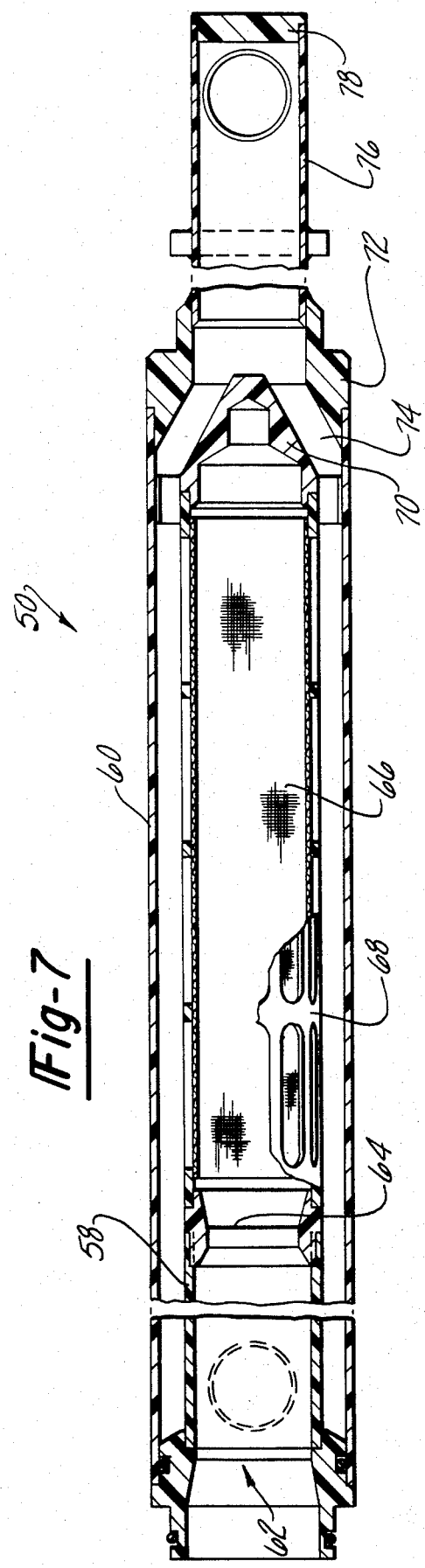

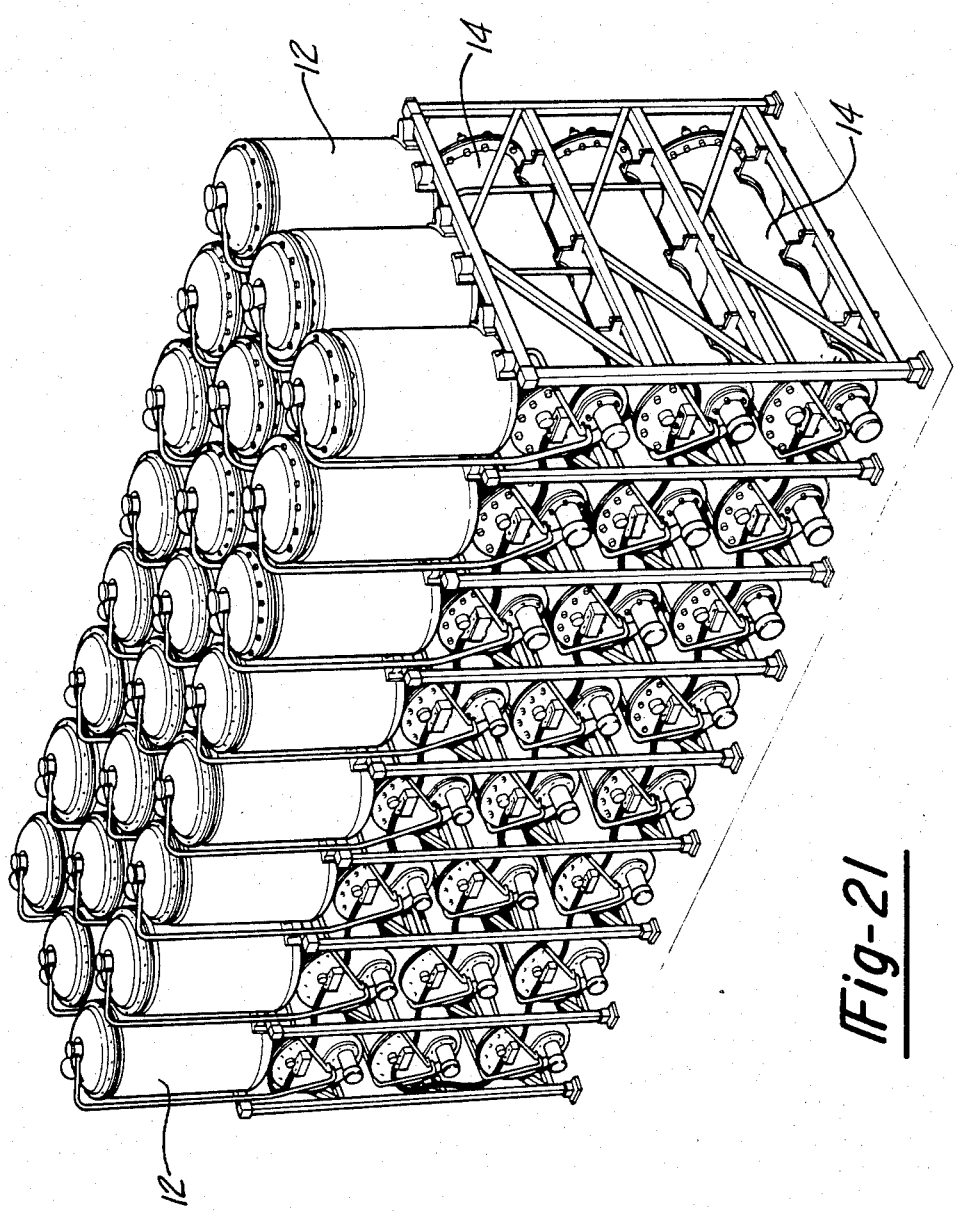

HYDROGEN GAS RELIEF VALVE

The Government of the United States of America has rights in this invention pursuant to Contract No. DE-AC02-78ET26923/II awarded by the U.S. Department of Energy.

The present invention relates generally to electrochemical systems, and particularly to a gas relief valve for closed cell compartments in a metal-halogen battery stack.

BACKGROUND AND SUMMARY OF THE INVENTION

Electrochemical devices or systems of the type referred to herein include one or more of the metal-halogen battery systems, such as a zinc-chloride battery system. These metal-halogen battery systems generally are comprised of three basic components, namely an electrode stack section, an electrolyte circulation subsystem, and a store subsystem. The electrode stack station typically includes a plurality of cells connected together electrically in various series and parallel combinations to achieve a desired operating voltage and current at the battery terminals over a charge/discharge battery cycle. Each cell is comprised of a positive and negative electrode which are both in contact with an aqueous metalhalide electrolyte. The electrolyte circulation subsystem operates to circulate the metalhalide electrolyte from a reservoir through each of the cells in the electrode stack in order to replenish the metal and halogen electrolyte ionic components as they are oxidized or reduced in the cells during the battery cycle. In a closed, self-contained metal-halogen battery system, the storage subsystem is used to contain the halogen gas or liquid which is liberated from the cells during the charging of the battery system for subsequent return to the cells during the discharging of the battery system. In the zinc-chloride battery system, chlorine gas is liberated from the positive electrodes of the cells and stored in the form of chlorine hydrate. Chlorine hydrate is a solid which is formed by the store subsystem in a process analogous to the process of freezing water where chlorine is included in the ice crystal.

With reference to the general operation of a zinc-chloride battery system, an electrolyte pump operates to circulate the aqueous zinc-chloride electrolyte from a reservoir to each of the positive or "chlorine" electrodes in the electrode stack. These chlorine electrodes are typically made of porous graphite, and the electrolyte passes through the pores of the chlorine electrodes into a space between the chlorine electrodes and the opposing negative or "zinc" electrodes. The electrolyte then flows up between the opposing electrodes or otherwise out of the cells in the electrode stack and back to the electrolyte reservoir or sump.

During the charging of the zinc-chloride battery system, zinc metal is deposited on the zinc electrode substrates and chlorine gas is liberated or generated at the chlorine electrode. The chlorine gas is collected in a suitable conduit, and then mixed with a chilled liquid to form chlorine hydrate. A gas pump is typically employed to draw the chlorine gas from the electrode stack and mix it with the chilled liquid, (i.e., generally either zinc-chloride electrolyte or water). The chlorine hydrate is then deposited in a store container until the battery system is to be discharged.

During the discharging of the zinc-chloride battery system, the chlorine hydrate is decomposed by permitting the store temperature to increase, such as by circulating a warm liquid through the store container. The chlorine gas thereby recovered is returned to the electrode stack via the electrolyte circulation subsystem, were it is reduced at the chlorine electrodes. Simultaneously, the zinc metal is dissolved off of the zinc electrode substrates, and power is available at the battery terminals.

Over the course of the zinc-chloride battery charge/discharge cycle, the concentration of the electrolyte varies as a result of the electrochemical reactions occurring at the electrodes in the cells of the electrode stack. At the beginning of charge, the concentration of zinc-chloride in the aqueous electrolyte may typically be 2.0 molar. As the charging portion of the cycle progresses, the electrolyte concentration will gradually decrease with the depletion of zinc and chloride ions from the electrolyte. When the battery system is fully charged, the electrolyte concentration will typically be reduced to 0.5 molar. Then, as the battery system is discharged, the electrolyte concentration will gradually swing upwardly and return to the original 2.0 molar concentration when the battery system is completely or fully discharged.

Further discussion of the structure and operation of zinc-chloride battery systems may be found in the following commonly assigned patents: Symons U.S. Pat. No. 3,713,888 entitled "Process For Electrical Energy Using Solid Halogen Hydrates"; Symons U.S. Pat. No. 3,809,578 entitled "Process For Forming And Storing Halogen Hydrate In A Battery"; Carr et al U.S. Pat. No. 3,909,298 entitled "Batteries Comprising Vented Electrodes And Method of Using Same"; Carr U.S. Pat. No. 4,100,332 entitled "Comb Type Bipolar Electrode Elements And Battery Stack Thereof". Such systems are also described in published reports prepared by the assignee herein, such as "Development of the Zinc-Chloride Battery for Utility Applications", Interim Report EM-1417, May 1980, and "Development of the Zinc-Chloride Battery for Utility Applications", Interim Report EM-1051, April 1979, both prepared for the Electric Power Research Institute, Palo Alto, Calif. The specific teachings of the aforementioned cited references are incorporated herein by reference.

During the operation of the zinc-chloride battery system it is inevitable that some hydrogen is evolved from the zinc electrode substrates, since the equilibrium potential of the metallic zinc in aqueous zinc-chloride is such that hydrogen gas must be formed by the decomposition of water. While the evolution of hydrogen gas from pure zinc metal is very low due to the high over voltage for hydrogen, this evolution rate is subject to several considerations including zinc morphology and the presence of impurities in the zinc deposit. Nevertheless, this rate of hydrogen evolution is typically very small in comparison to the evolution of chlorine gas which is generated at the chlorine electrode during the charging of the battery system. While it is important in the zinc-chloride battery system to minimize the rate of hydrogen evolution due to the fact that hydrogen evolution represents a coulombic inefficiency, the amount of hydrogen gas in the battery stack can be reduced subsequent to its generation by a reaction with chlorine gas.

In the zinc-chloride battery system, a controlled chemical reaction between chlorine gas and hydrogen gas is achieved by providing one or more lights having a wave length of light radiation generally within the ultraviolet range. Thus, during the charging of the zinc-chloride battery system the chlorine and hydrogen gases generated by the cells are exposed to an ultraviolet light source which will cause these gases to form hydrogen chloride. Additionally, during the discharging of the zinc-chloride battery system the chlorine gas and any hydrogen gas which may be present in the gas space of the stack area above the cells may also be exposed to this ultraviolet light source.

In prior zinc-chloride battery stack designs, the battery cells have been housed in trays or otherwise arranged so that the tops of the cells are open in order to permit the chlorine and hydrogen gases to be liberated from the cells. However, in accordance with the present invention the battery cells are arranged in substantially closed cell compartments which include a top section for controlling both the flow of electrolyte into and out of the cell compartment and the liberation of gas from the cell compartment. With such a closed cell compartment, it is possible for a quantity of gas to be trapped in the gas space above the cells in the cell compartment during a standby mode. Since hydrogen gas will continue to evolve at the zinc electrodes of the cells in the cell compartment in the standby mode after the battery system has been charged, it is possible for a quantity of hydrogen gas to accumulate within the cell compartment over an extended period of time. Then, when the discharging of the battery system is commenced, the accumulated hydrogen gas from the cell compartment will be liberated therefrom and exposed to the ultraviolet light source in a proportion relative to the amount of chlorine gas which could exceed a desirable level.

Accordingly, it is a principal objective of the present invention to provide an improved electrochemical system battery stack design which is capable of selectively venting gas from the cells.

It is a more specific objective of the present invention to provide an improved battery stack design which is capable of automatically venting gas from the cell at predetermined times without resorting to any electrical controls.

It is a further objective of the present invention to provide an improved cell design for a zinc-chloride battery system in which hydrogen gas is vented from the cell during a charge standby mode.

To achieve the foregoing objectives, the present invention provides an improved battery stack design which features means for defining a substantially closed compartment for containing the battery cells and at least a portion of the electrolyte for the system, and means in association with the compartment means for selectively venting gas from the interior of the compartment means in response to the level of the electrolyte within the compartment means. The venting means includes a relief valve having a float member which is actuated in response to the level of the electrolyte within the compartment means. This float member is adapted to close the relief valve when the level of the electrolyte is above a predetermined level and open the relief valve when the level of electrolyte is below this predetermined level.

Additional advantages and features for the present invention will become apparent from a reading of the detailed description of the preferred embodiments which make reference to the following set of drawings in which:

BRIEF DESCRIPTION OF THE DRAWINGS

FIG. 6 is a fragmentary plan view of the electrolyte distribution manifold for the electrolyte circulation subsystem.

FIG. 7 is a framentary cross-sectional view of the manifold shown in FIG. 10 taken along lines 7—7.

FIG. 21 is a high density arrangement of a plurality of battery systems of the type shown in FIG. 20.

DETAILED DESCRIPTION OF THE PREFERRED EMBODIMENTS

Figure 1:
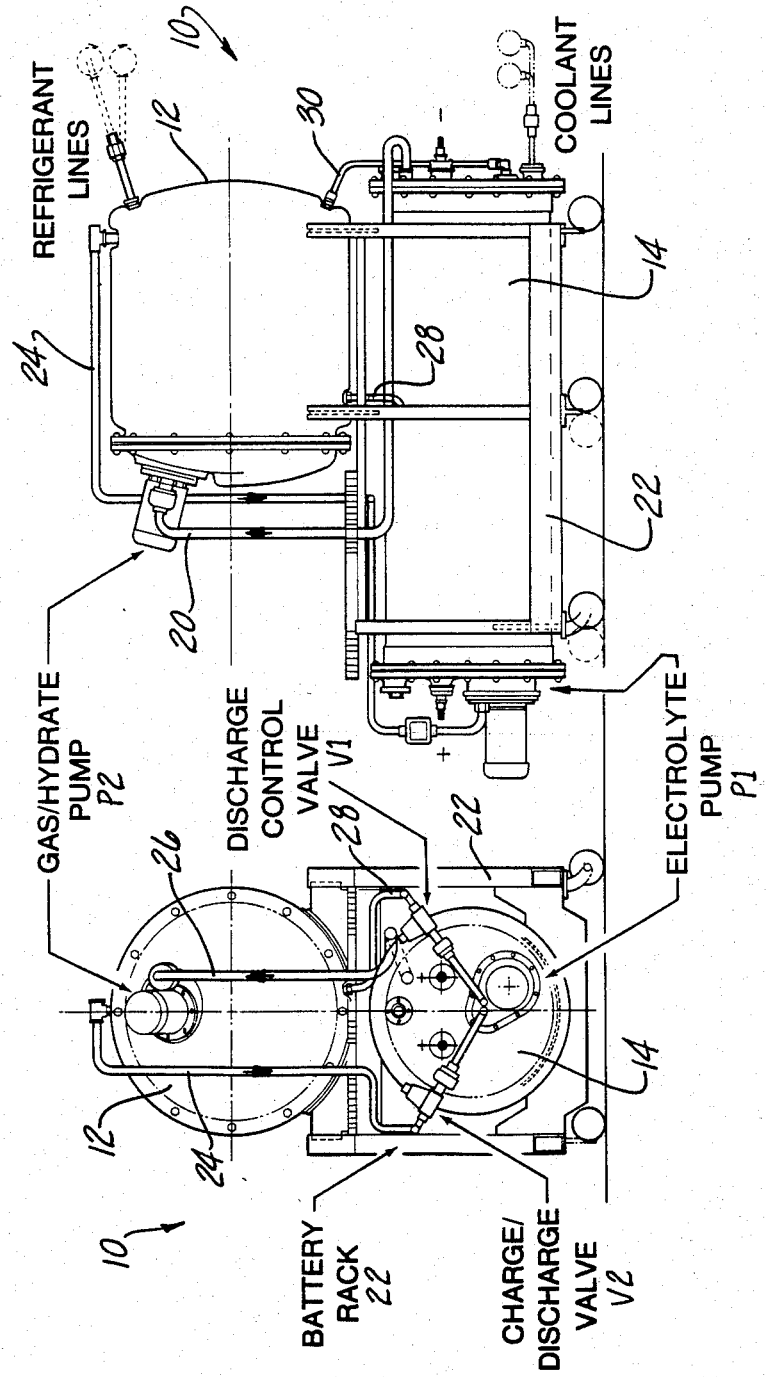
FIG. 1A is a side elevation view of one embodiment of a zinc-chloride battery system according to the present invention.
FIG. 1B is a front elevation view of the battery system shown in FIG. 1A.

Referring to FIGS. 1A and 1B, two elevation views of a zinc-chloride battery system 10 in accordance with the present invention are shown. The various components of the battery system 10 are housed by two interconnected cylindrical vessels 12 and 14, which may best be illustrated by the schematic diagram of FIG. 2. The upper vessel or case 12 is used to contain the chlorine hydrate store subsystem generally designated by reference numeral 16. The lower vessel or case 14 is used to contain both the battery stack 18 and the electrolyte circulation subsystem generally designated by reference numeral 20.

The cylindrical vessels 12 and 14 are supported by a battery rack structure 22. The vessels 12 and 14 are preferably made from fiberglass-reinforced plastic (FRP) with an internal polyvinyl chloride (PVC) liner bonded thereto which is chemically resistant or inert to the electrolyte and the other chemical entities present within these vessels. The vessels 12 and 14 are interconnected by four fluid exchange lines or conduits 24, 26, 28 and 30, and the direction of fluid flow through these lines are indicated by the appropriate arrows. Additionally, the battery system 10 is provided with four refrigerant lines or conduits 32, 34, 36 and 38. Refrigerant lines 32 and 34 are used to supply a coolant to the store subsystem 16 during the charging of the battery system for reducing the temperature inside vessel 12 to the appropriate level to form chlorine hydrate. Refrigerant lines 36 and 38 are used to supply a coolant to the sump or electrolyte reservoir 40 of the electrolyte circulation subsystem 20 to control the temperature of the zinc-chloride electrolyte.

Figure 2:
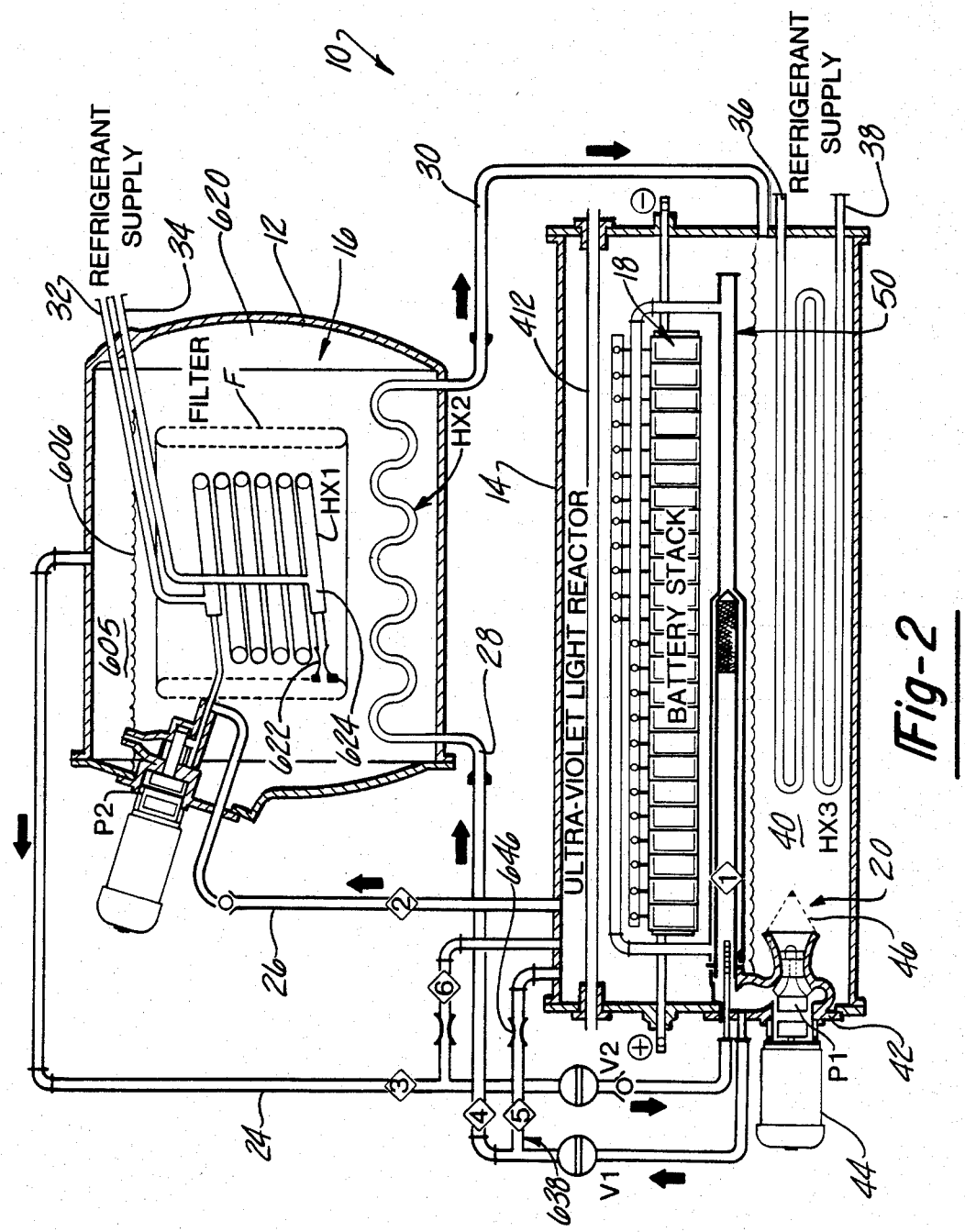
FIG. 2 is a schematic diagram of the battery system shown in FIGS. 1A and 1B.
Figure 3:
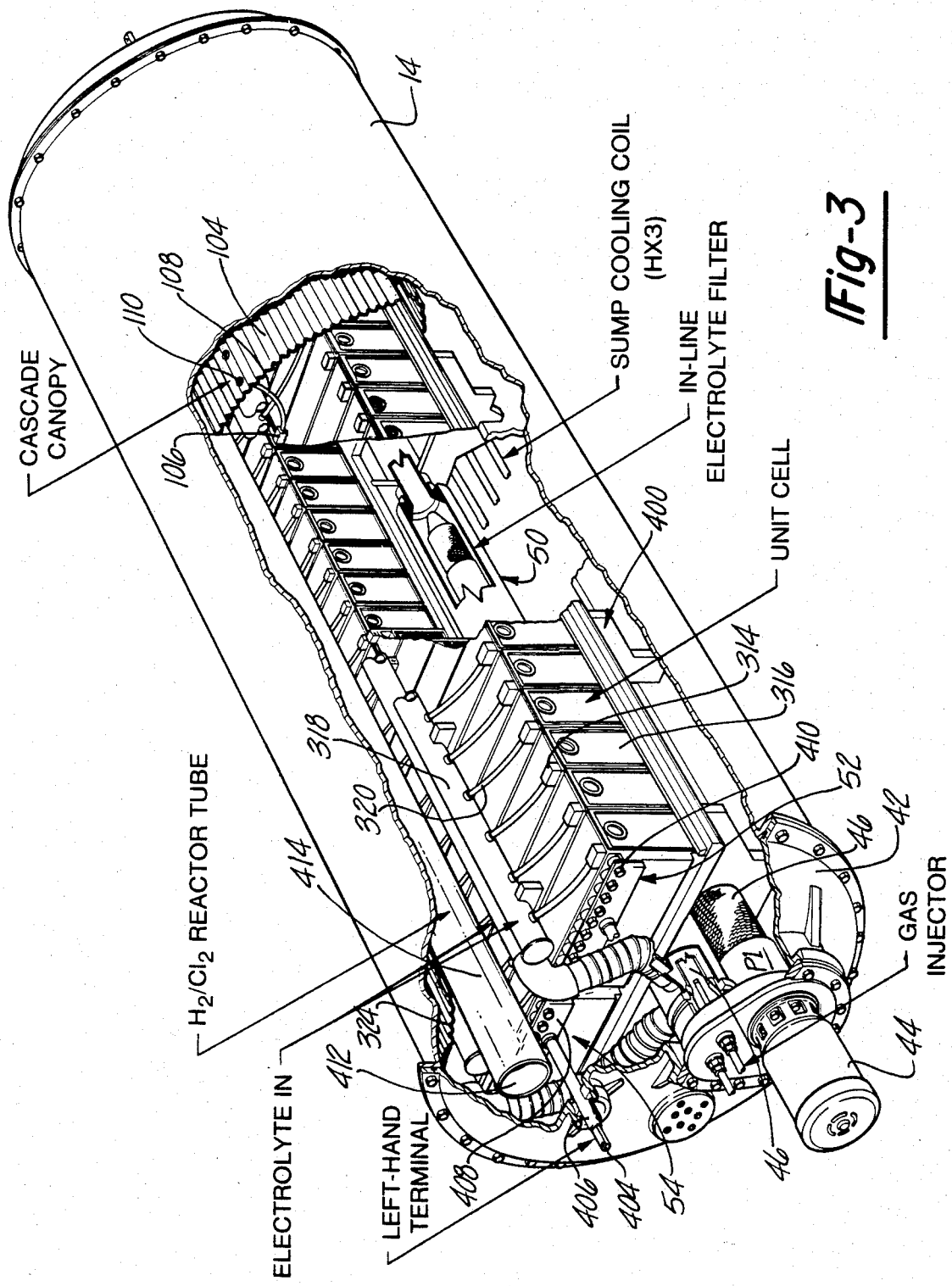
FIG. 3 is a cutaway perspective view of the stack and electrolyte circulation subsystems for the battery system shown in FIGS. 1 and 2.

Referring now to FIGS. 2 and 3, the electrolyte circulation subsystem 20 will now be described. The electrolyte circulation subsystem 20 includes an ovate electrolyte pump "P1" which is mounted to the front end cap 42 of the bottom vessel 14 below the electrolyte level in the sump 40. The electrolyte pump P1 is driven by an electric motor 44 which is magnetically coupled to the electrolyte pump. The electrolyte pump 42 is preferably of the centrifugal type manufactured by Ingersoll-Rand. The electrolyte pump 42 is adapted to draw electrolyte from the sump 40 through a titanium protective screen filter 46, and discharge the electrolyte axially through a slip joint 48 into a unique center-feed electrolyte distribution manifold 50.

The manifold 50 is used to distribute electrolyte to each of the unit cells in the pair of submodules 52 and 54 which comprise the battery stack 18. The manifold 50 not only uniformly distributes the electrolyte to each of the unit cells in the submodule 52 and 54, but also acts to control and suppress the flow of parasitic currents which flow in the electrolyte circulation subsystem. Parasitic currents are those electrical currents which flow in the conductive paths created by the network of electrolyte connections linking the cells. With the provision of the manifold 50, especially in combination with inlet and outlet crossed distribution tubes arrangements, significant improvements in the suppression of parasitic currents have been achieved which will be discussed more fully below.

Figure 4:
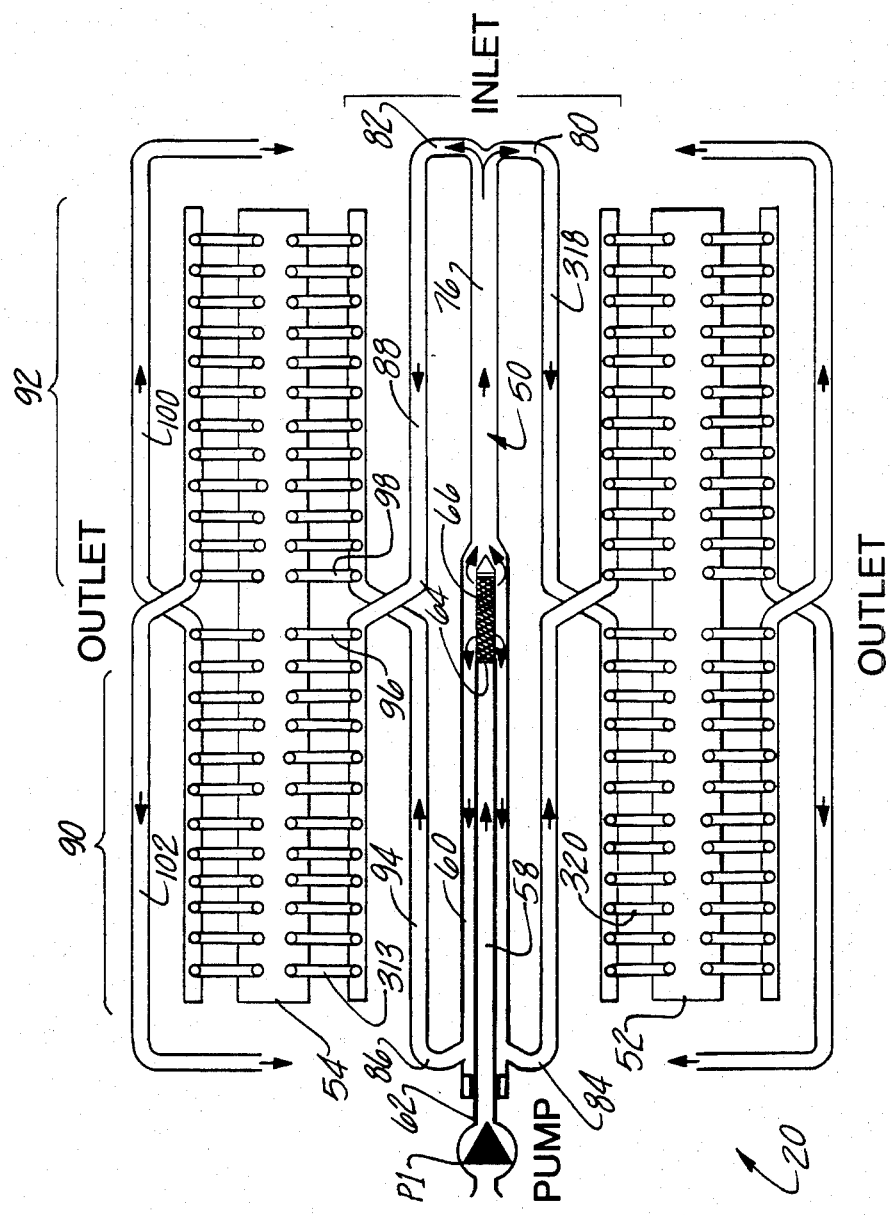
FIG. 4 is a schematic diagram of the electrolyte circulation subsystem shown in the FIGS. 2 and 3.
Figure 5:
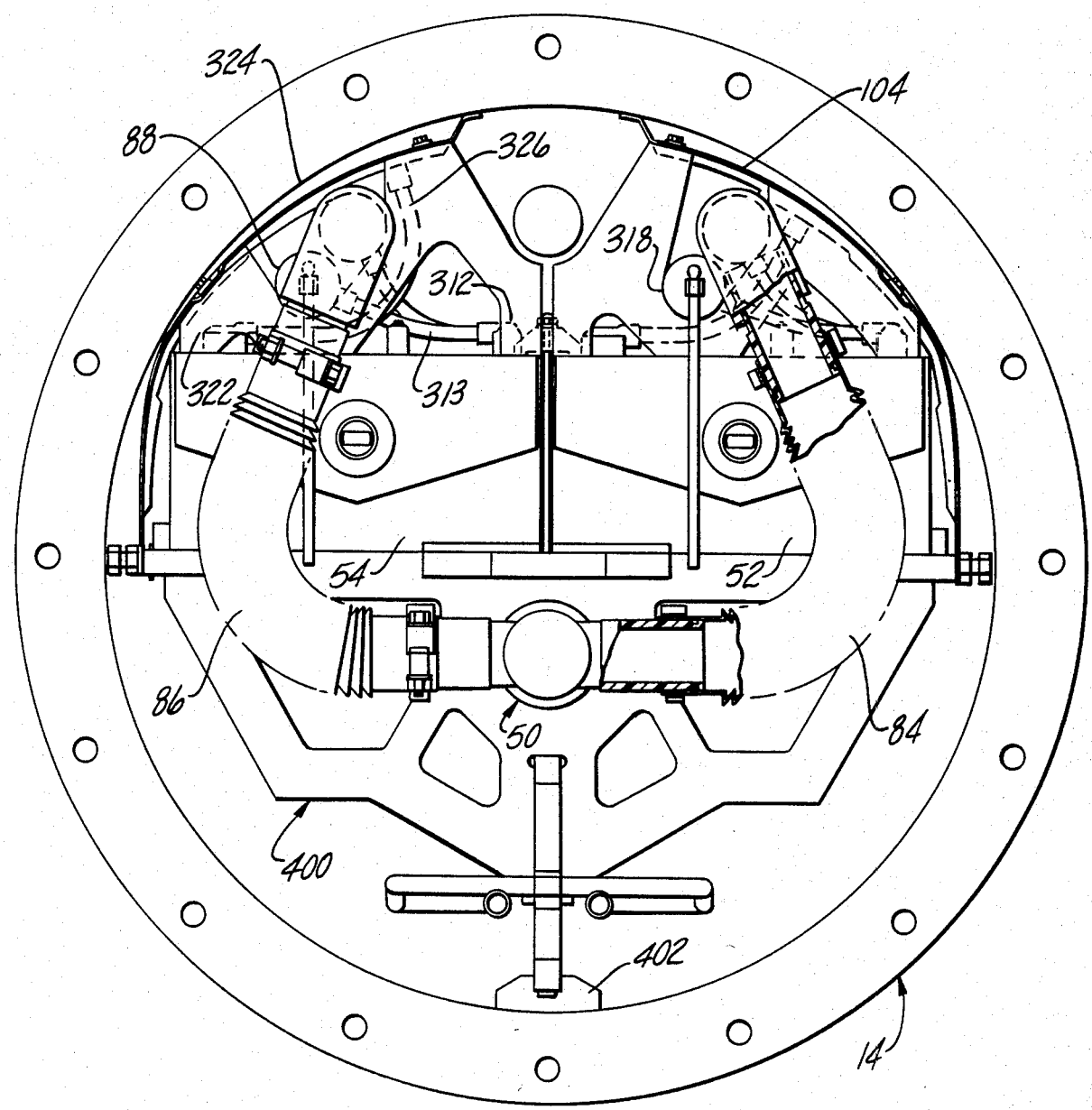
FIG. 5 is a front elevation view of the stack and electrolyte circulation subsystems shown in FIG. 3 with the end cap removed.

Referring to FIG. 4, a schematic diagram of one embodiment of the electrolyte circulation subsystem 20 is shown, which particularly illustrates the flow of electrolyte through the manifold 50. Reference may also be made to FIG. 5 which illustrates a front end view of electrolyte circulation subsystem in association with the submodules 52 and 54, and FIGS. 6 and 7 which illustrate two views of the manifold 50. The manifold 50 includes a central portion 56 comprising a pair of concentric tubes, namely inner tube 58 and outer tube 60. Inner tube 58 is in fluid communication with the electrolyte pump P1 at a first end 62 thereof and includes an open opposite end 64 which is fitted with an in-line wire mesh electrolyte filter 66. Filter 66 includes a perforated protective outer jacket 68 and terminates at its distal end in a cap or plug 70. Electrolyte is pumped through inner tube 58 and passes out through filter 66 into outer tube 60. Outer tube 60 is fitted with an end cap 72 which includes a fluid conduit path 74 for conducting fluid around the inner end cap 70 and thence into conduit 76. Conduit 76 is sealed as at end plate 78 and includes a pair of fittings 80 and 82 for bifurcating the electrolyte fluid path. Similarly, outer tube 60 includes a pair of fittings 84 and 86 at the end adjacent electrolyte pump P1 for providing yet another bifurcated fluid path. Electrolyte is thus pumped out through filter 66 and into outer tube 60, whereupon half of the fluid is transmitted through tube 76 generally away from electrolyte pump P1, while the other half is transmitted through outer tube 60 generally toward electrolyte pump P1. At fittings 80–82 and at fittings 84–86 the electrolyte flow is again split into four distribution paths for feeding individually both left and right halves of the two submodules 52 and 54.

With specific reference to FIG. 4, the crossed inlet distribution tubes arrangement may now be explained. It will be seen in FIG. 4 that, for example, the distribution tube 88, which is connected to fitting 82, feeds the left half 90 of submodule 54, the left half being physically more remote from fitting 82 than the right half 92. Similarly, fitting 86 is coupled via distribution tube 94 to the right half 92 of submodule 54. Hence the electrical circuit path between left and right paths of submodule 54 are quite elongated and provide substantial resistance against parasitic current flow. For example, parasitic current flow between unit cell feeder tubes 96 and 98 must travel the entire distance through tubes 88, fitting 82, tube 76, outer tube 60, fitting 86, and tube 94 in order to complete the shunt circuit. Although the length of this shunt circuit is substantial and the electrical resistance is therefore high, the fluid circuit thus described including the crossed inlet distribution tubes 88 and 94 provides remarkably little burden on electrolyte pump P1. Hence electrolyte pump P1 can be of a lower horsepower with a resultant improvement of the overall efficiency of the system.

The outlet portion of the electrolyte circulation subsystem 20 in the embodiment of FIG. 4 also employs the crossed outlet distribution tubes arrangement in order to increase the electrical resistance to parasitic current flow, in a similar manner as described above with respect to crossed inlet distribution tubes 88 and 94. With reference to FIG. 4 it will be seen that the left and right halves of each submodule, such as left and right halves 90 and 92, are cross-coupled to outlet tubes 100 and 102, respectively, in a fashion similar to the cross-coupled center feed inlet portion. Alternatively, the outlet portion of the electrolyte circulation subsystem 20 may employ a cascade canopy 104 as illustrated in FIGS. 3 and 5. In this alternative outlet arrangement each individual unit cell discharges through an outlet port 106 via discharge tube 108 and thence through orifices 110 onto the upper surface of the cascade canopy 104. The electrolyte then spills over the canopy 104, like rain water upon a shingled roof, spreading outwardly as it falls into sump 40, which improves the absorption of gaseous chlorine by the electrolyte during the discharge cycle.

The manifold 50, the inlet crossed distribution tubes arrangement and the outlet crossed collection tubes arrangement may broadly be viewed as different facets or building blocks of a more general principle or arrangement which may be called the center feed principle or arrangement, which is best explained by reference to prior art electrolyte distribution practices. In prior art zinc-chloride battery systems, electrolyte is typically delivered to each unit cell in a submodule comprised of series-connected unit cells via a common header, such a substantially continuous manifold or distribution tube, having relatively low electrolyte resistance from one end of the header to the other. This end feed arrangement allows relatively large parasitic currents to develop in virtually every inter-cell shunt circuit in the submodule. In contrast, the electrolyte distribution system illustrated in FIG. 4 delivers electrolyte to a single submodule (such as submodule 54 for example) composed of series-connected unit cells by splitting the electrolyte flow in half, and delivering (or removing) each half-flow through a physically distinct header (for example tubes 60 and 76 in manifold 50, or inlet distribution tubes 88 and 94) having a relatively large resistance to parasitic current flow. Thus, in comparison to the large parasitic currents existing between the commonly fed halves of the submodule in the prior art and feed arrangements, all shunt circuits in FIG. 4 existing between the separately fed (with electrolyte) halves of the submodule are dramatically reduced. Broadly speaking, then, the center feed arrangement may be said to encompass any electrolyte distribution scheme wherein the flow of electrolyte to a single submodule of series-connected unit cells is divided into two (or more) roughly equal portions and thereafter segregated for distribution (or collection) through two separate, electrically isolated headers having relatively large electrical resistances wherein each header supplies electrolyte to (or collects electrolyte from) a plurality of series-connected unit cells, and the parasitic currents caused by inter-cell shunt circuits between the separately fed portions of the submodule are substantially reduced relative to an end feed electrolyte distribution arrangement. The electrolyte circulation subsystem 20 of the battery system 10 disclosed herein was specifically designed so as to incorporate the foregoing center feed principle and to maximize the advantageous reduction in parasitic currents obtainable by utilizing a center feed arrangement.

Figure 8:
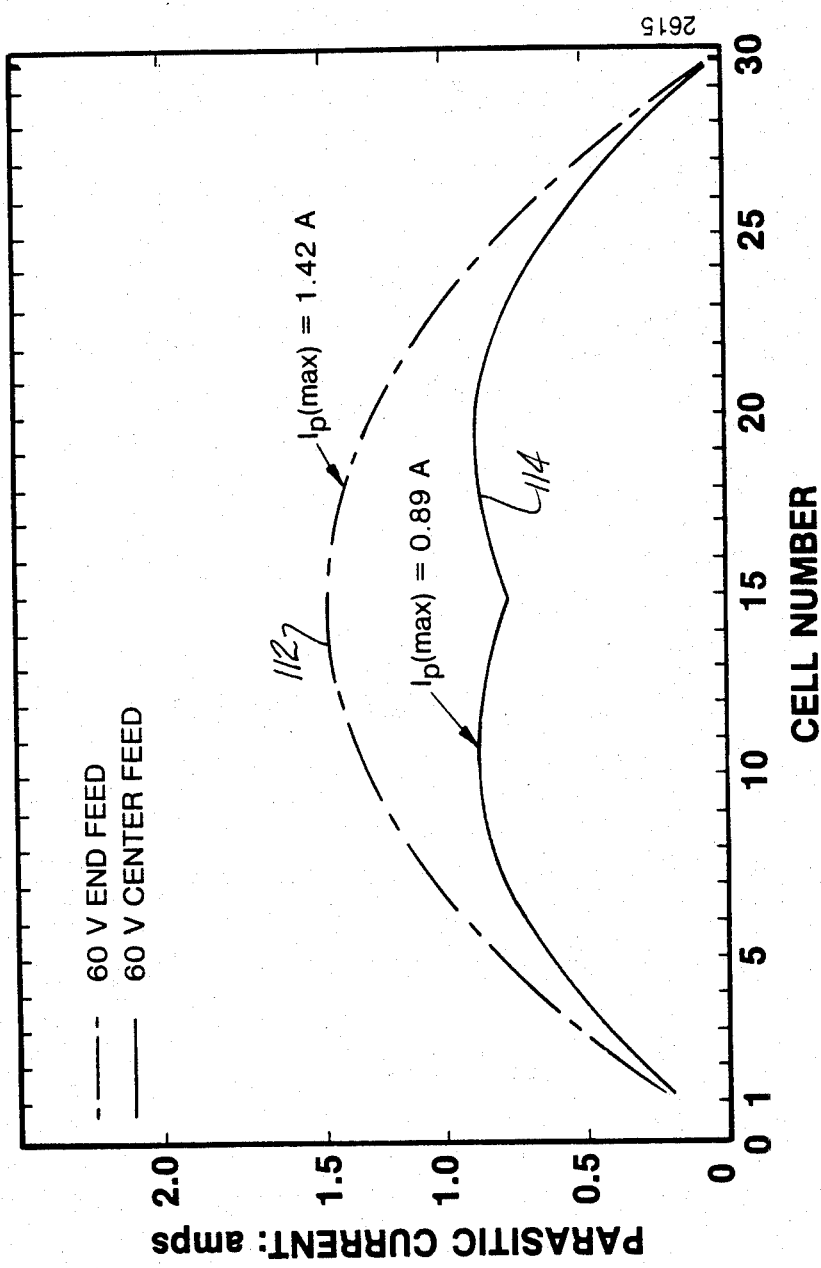
FIG. 8 is a graph comparing parasitic current values associated with two electrolyte circulation schemes.

The effectiveness of the above-described center feed electrolyte distribution arrangement is exemplified by reference to FIG. 8. FIG. 8 is a graphical representation of typical shunt or parasitic current values displayed along the ordinate as a function of the cell number displayed along the abscissa. For illustration purposes a battery having thirty unit cells connected electrically in series has been assumed, although it should be understood that the same advantageous results are obtainable in batteries having a different number of unit cells connected electrically in series. As related above, all of the cells in the battery are served by one electrolyte pump through a common supply and return manifolding. This common electrolyte manifolding provides an electrically conductive path through which current will pass when a voltage is present across the battery terminals and electrolyte circulation subsystem 20 including the battery stack is full of electrolyte. This shunt current reduces the effective current flowing through the cells during charge and causes cells in the battery to self discharge during discharge at different rates. In general, this results in faster depletion of zinc from the electrodes of cells in the center of the battery stack, and can cause measurable differences in the coulombic efficiency of cells within the battery stack.

Knowing the resistivity of the electrolyte and the sizes of different portions of the electrolyte circulation subsystem 20, the effective electrical resistances of the various sections can be calculated. An equivalent electrical circuit model may then be constructed, if desired, in accordance with the teachings of U.S. Pat. No. 4,371,825, issued on Feb. 1, 1983 to Chi et al, entitled "Method Of Minimizing The Effects Of Parasitic Currents", which is hereby incorporated by reference. FIG. 8 is a graph comparing parasitic current values during charging which were calculated from such an electrical circuit model. FIG. 8 includes a curve 112 which represents the parasitic current distribution for a battery system having a prior art end-feed electrolyte distribution manifold, and a curve 114 which represents the parasitic current distribution for a battery system in accordance with the present invention having a center-feed electrolyte distribution manifold. It is important to note that the total parasitic current flow of curve 112 is not only greater than that for curve 114, but curve 114 indicates that the parasitic current distribution is considerably more uniform when the center-feed manifold is utilized. This benefit of the center-feed manifold is advantageous because it is not only desirable to minimize parasitic current flow, but is is also desirable to have a uniform distribution of the parasitic currents across the battery stack in order to achieve a substantially uniform coulombic efficiency for each of the unit cells in the battery stack.

Figure 9:
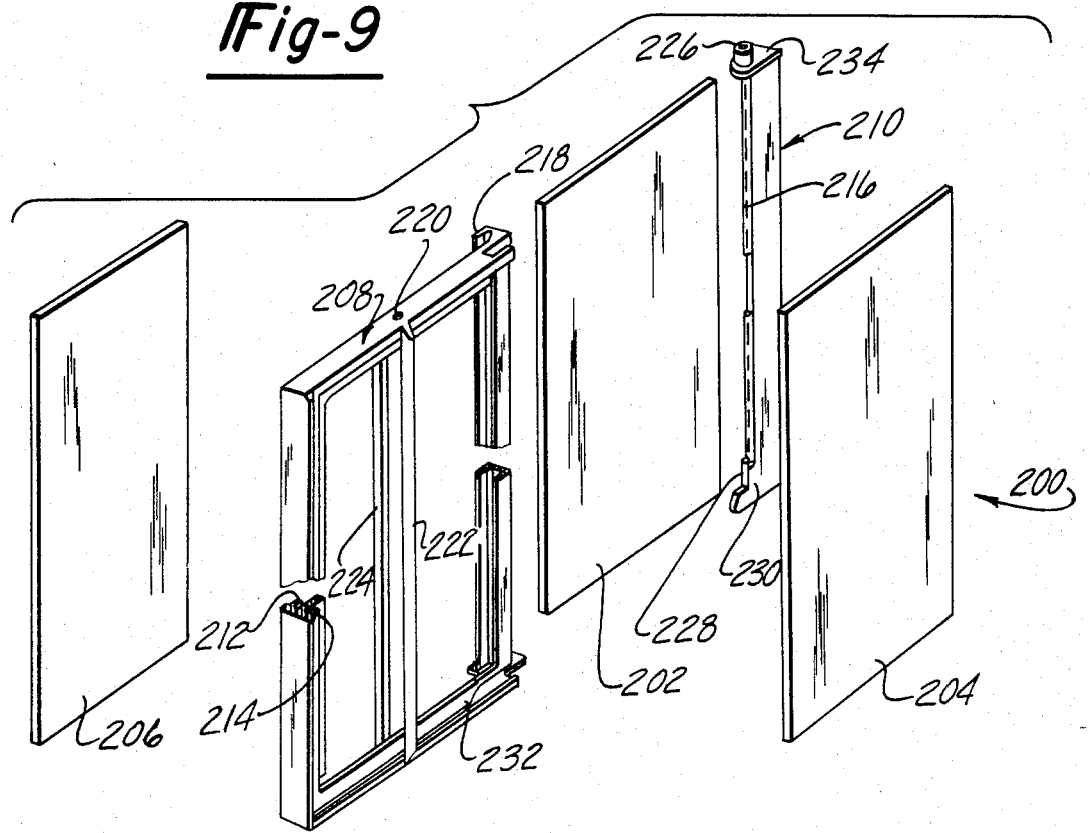
FIG. 9 is an exploded perspective view of an electrode assembly which forms the basic building block of the battery stack shown in FIGS. 2 and 3.

Referring to FIG. 9, an exploded view of a zinc-chloride battery electrode assembly 200 is shown which forms the basic building block of the battery stack 18. Electrode assembly 200 generally comprises a pair of porous graphite positive or chlorine electrodes 202 and 204, a dense graphite negative or zinc electrode 206, and plastic frame members 208 and 210. The positive electrodes 202 and 204 are adapted to slide into channels 212 and 214, respectively, in the frame member 208 such that the frame member supports these two electrodes along the top and bottom edges as well as along one of the side edges. The frame member 208 operates to align the positive electrodes 202 and 204 in parallel and provides an internal cavity between these electrodes. The frame member 208 is also formed to nestingly receive the frame member 210 between the positive electrodes 202 and 204.

The frame member 210 includes a plastic-feed tube 216 for conveying electrolyte from a unit cell manifold to the internal cavity between the positive electrodes 202 and 204. The frame member 208 is also formed with a channel 218 which is adapted to receive a side edge of the negative electrode 206 and align the negative electrode 206 in parallel with the positive electrode 202. Accordingly, it will be appreciated that the frame member 208 serves to align and separate the positive electrodes 202 and 204 from each other, and also to align and separate the negative electrode 206 from the positive electrode 202. The separation between the negative electrode 206 and the positive electrode 202 is referred to as the inter-electrode gap which may generally range from about 40 mils (1 mm) to about 250 mils (6 mm) and is preferably about 129 mils (3.3 mm).

The frame member 208 also serves to control the edge effects of the positive electrodes 202 and 204 by providing an integral masking or screening around the edges of the positive electrodes in order to modify the electrochemical activity along these edges. Generally speaking, the channels 212, 214 and 218 are formed such that the apparent surface area of the positive electrodes is smaller in comparison with the apparent surface area of the negative electrodes. A more detailed discussion of masking edge effects may be found in the commonly assigned Carr et al, U.S. Pat. No. 4,241,150, entitled "Method for Control of Edge Effects of Oxidant Electrode", which is hereby incorporated by reference.

It should also be noted that the frame member 208 includes an orifice 220 at the top thereof for venting any undissolved chlorine gas which could otherwise be trapped in the internal cavity between the positive electrodes 202 and 204. Additionally, the frame member 208 is formed with a pair of opposing, vertically extending spacing ribs 222 and 224. The ribs 222 and 224 restrain any tendency of the positive electrodes 202 and 204 to bow outwardly, and insure that the desired inter-electrode gap between the positive and negative electrodes is maintained. The integrity of this inter-electrode gap is important because it has been found that with increased gaps on the order of 129 mils the electrical current density for the battery system may be significantly increased. Also such increased gaps permit higher zinc loadings on the negative electrodes, which in turn means that substantial cost savings can be achieved through the reduction in the number of electrodes required to store an equivalent amount of electrical energy.

The feed tube 216 of the electrode assembly 200 is press fit into a socket which is formed into an upwardly extending nipple portion 226 of the frame member 210. Additionally, the bottom end of the feed tube 216 is trapped between an upwardly extending clip portion 228 and the support channel portion 230 of the frame member 210. It should also be noted that the bottom end of the support channel portion 230 of the frame member 210 is shaped to mate with the bottom end of the internal separator portion 232 of the frame member 208. This contoured shaping at the bottom end operates in combination with a generally horizontally extending flange portion 234 of the frame member 210 at the top thereof to lock the frame member 210 to the frame member 208.

With respect to the materials which may be used to construct the electrode assembly 200, it is preferred that the positive electrodes 202 and 204 be constructed from Union Carbide Corp. PG-60 or TS-1697 graphite, or Airco Carbon Co. S-1029 or S-1517 graphite. With respect to the negative electrode 206, it is preferred that this electrode be constructed from Union Carbide Corp. ECL grade graphite or alternative grades such as ATR or ATJ graphite herein. With respect to the frame members 208 and 210 and the tube 216, these components (as well as the other plastic components to be described below) may be constructed from any suitable electrically nonconductive material which is chemically resistant or inert to the electrolyte and other chemical entities with which they will come into contact. While it is preferred that the frame members 208 and 210 be constructed from General Tire and Rubber Corp. Boltaron ® polyvinylchloride or B. F. Goodrich Corp. Geon ® Polyvinyl-chloride and the tube 216 from Du-Pont Teflon ® (polytetrafluoro-ethylene), other suitable plastic materials may be employed such as Penwalt Kynar ® (polyvinylidene fluoride) or any of the other appropriate materials described in Section 33 of The Development of the Zinc Chloride Battery For Utility Applications, April 1979 report identified earlier.

Figure 10:
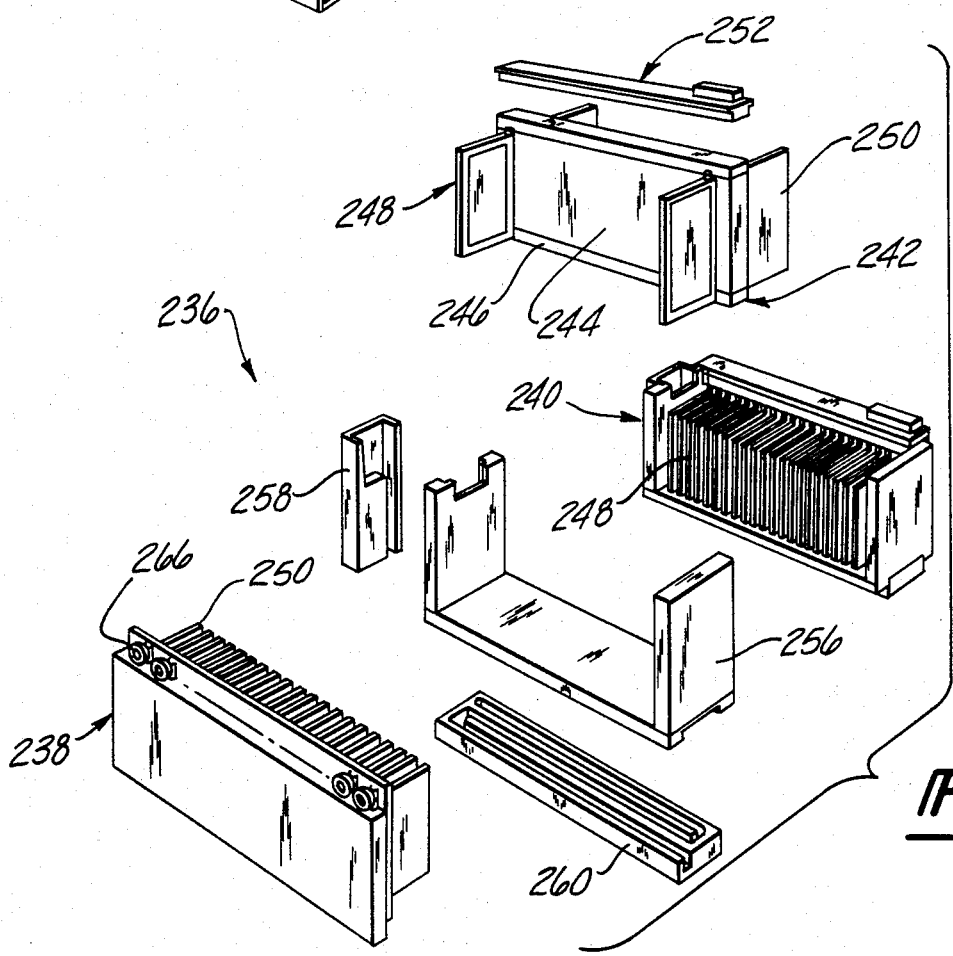
FIG. 10 is a fragmentary exploded view of an "open" submodule for a zinc-chloride battery stack.

Referring to FIG. 10, an exploded view of the "open" submodule 236 for a zinc-chloride battery stack is shown. The submodule 236 generally comprises a zinc termination comb assembly 238, a chlorine termination comb assembly 240, and one or more bipolar intermediate comb assemblies 242. While the submodule 236 is shown with only one intermediate comb assembly 242, it should be appreciated that the submodule may be expanded by merely providing for more intermediate comb assemblies. As shown in FIG. 10, the submodule 236 includes two "unit" cells connected electrically in series. Each of these unit cells comprise a number of single cells (i.e., a positive electrode and an opposing negative electrode) connected electrically in parallel.

Figure 11:
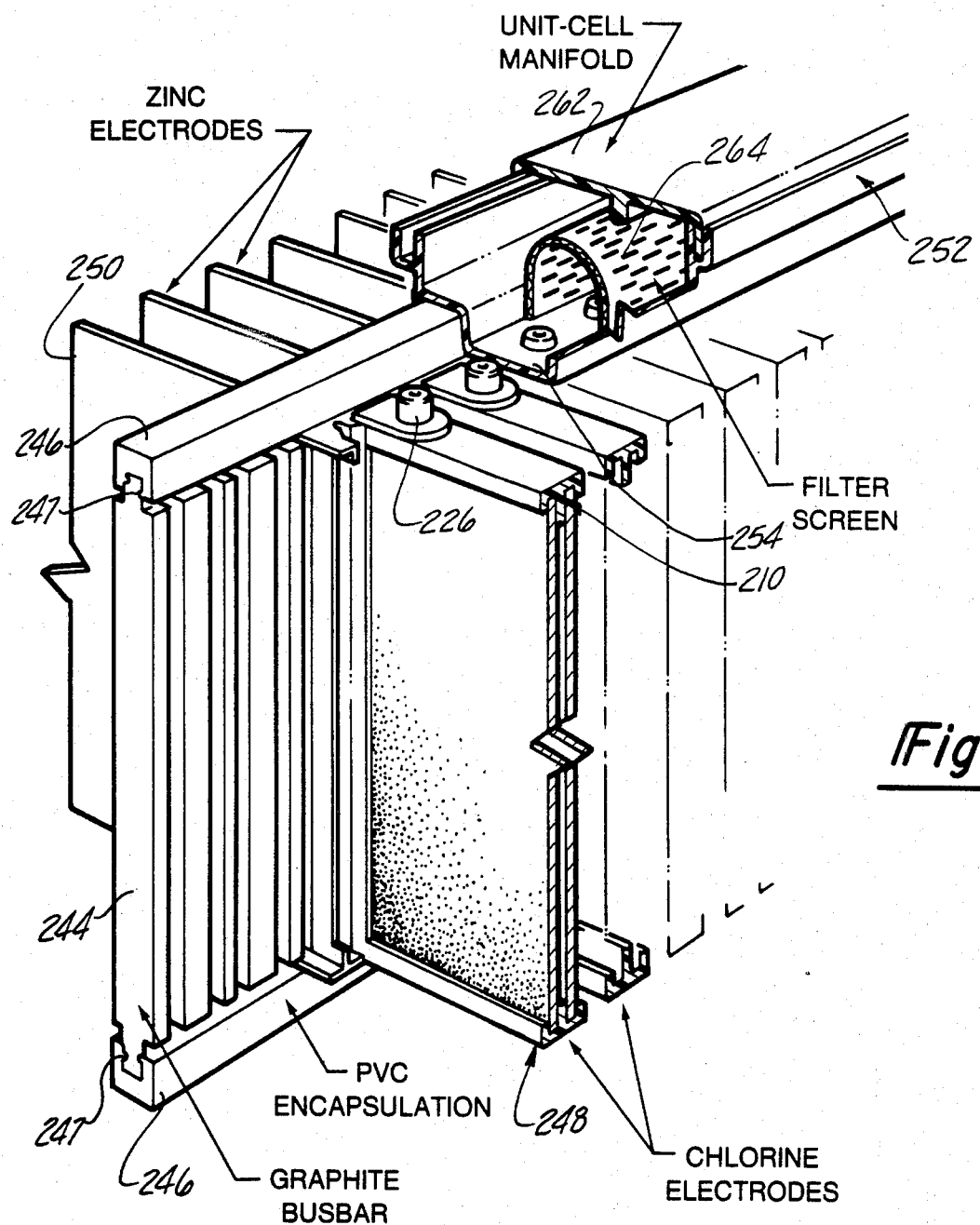
FIG. 11 is a perspective view of a comb assembly employed in the submodule shown in FIG. 10.

The intermediate comb assembly 242, which may best be seen with reference to FIG. 11, includes an electrically conductive bus member 244 (i.e. constructed from dense graphite) which has two generally planar opposing faces and a plastic frame 246 generally disposed around the edges of the bus member to provide an ionic seal between adjacent unit cells. Frame 246 is preferably formed by injection molding PVC about the edges of bus member 244. A pair of opposed longitudinally extending grooves 247 may be used to provide a mechanical interlock between this PVC encapsulation and the edges of bus member 244. A plurality of positive electrode structures 248 are attached via a press or interference fit connection to one exterior face of the bus member 244, which is provided with spaced vertical grooves 249, while a plurality of negative electrodes 250 are attached to the other face of the bus member in a similar fashion. Each of the positive electrode structures 248 are constructed in accordance with the electrode assembly 200 of FIG. 9, and include the positive electrodes 202 and 204, and the plastic frame members 208 and 210. A unit cell electrolyte distribution manifold 252 is ultrasonically welded or otherwise secured to the top section of each frame 246 such that electrolyte may be conveyed to the feed tubes 216. Specifically, the nipples 226 extending from the top of the frame members 210 are inserted through holes in the bottom tray 254 of the manifold 252. These nipples 226 are then welded by thermal swaging to the bottom tray 254 of the manifold 252 to provide a leak-proof connection.

In order that each unit cell may be separately sealed, a plastic tray 256 as shown in FIG. 10 is welded or otherwise secured to the bus bar frame 246 in a fluid tight connection. A return path for the electrolyte supplied to each of the unit cells is provided by a collection cup 258 and a discharge serpentine channel plate 260 which are adapted to receive the electrolyte flowing from the unit cell and direct this electrolyte to the reservoir or sump. As in the case of the other plastic frame members or components, the collection cup 258 and the discharge serpentine channel plate 260 are welded or otherwise secured (such as by solvent bonding) to the tray 256 in a fluid tight connection.

As illustrated in FIG. 11, the unit cell distribution manifold 252 also includes a top cover 262 which is secured to the bottom tray 254 by welding or solvent bonding. An important feature of the manifold 252 is the provision of a plastic perforated screen 264 which extends along the complete length of the manifold between the bottom tray 254 and the top cover 262. The perforations in the screen 264 are selected to be suitably smaller than the diameter of the opening in the nipples 226 of the frame member 210, so that any particles which could plug or obstruct fluid flow through the feed tubes 216 will be filtered by the screen 264. The screen 264 is preferably constructed from Kynar ® and is preferably bent over in a generally U-shape. It should also be noted that the manifold 252 is also provided with a suitable orifice 265 (shown in FIG. 12) for permitting any gas which could otherwise be trapped in the manifold to escape. The location of orifices 265 near the outside edges of the unit cell also assures that sufficient electrolyte flow will occur adjacent the outermost electrodes of the unit cell.

In FIG. 10, the aforementioned plastic components 252 through 264 are shown in an assembled state with reference to the chlorine termination comb assembly 240. The chlorine termination comb assembly 240 is similar in construction to the intermediate comb assembly 242 except that the chlorine termination comb assembly is not provided with a plurality of negative electrodes 250 along one face of the bus bar 244. However, the chlorine termination comb assembly 240 includes a plurality of electrical terminals mounted to the bus bar 244 to facilitate external electrical connections to the submodule 236. These electrical terminals, generally designated by reference numeral 266, are illustrated with reference to the zinc termination comb assembly 238. The zinc termination comb assembly 238 simply comprises a bus bar whose edges and external face are enclosed in a plastic frame and a plurality of negative electrodes attached on the internal face thereof. In an assembled state, the positive electrode structures 248 of the intermediate comb assembly 242 will be interdigitated with the negative electrodes 250 of the zinc termination comb assembly 238, and the negative electrodes 250 of the intermediate comb assembly 242 will be interdigitated with the positive electrode structures 248 of the chloride termination comb assembly 240. Accordingly, the positive electrode structures 248 of the intermediate comb assembly 242 and the negative electrodes 250 of the zinc termination comb assembly 238 will form one unit cell, and the negative electrodes 250 of the intermediate comb assembly 242 and the positive electrode structures 248 of the chlorine termination comb assembly 240 will form the other unit cell of the submodule 236.

Figure 12:
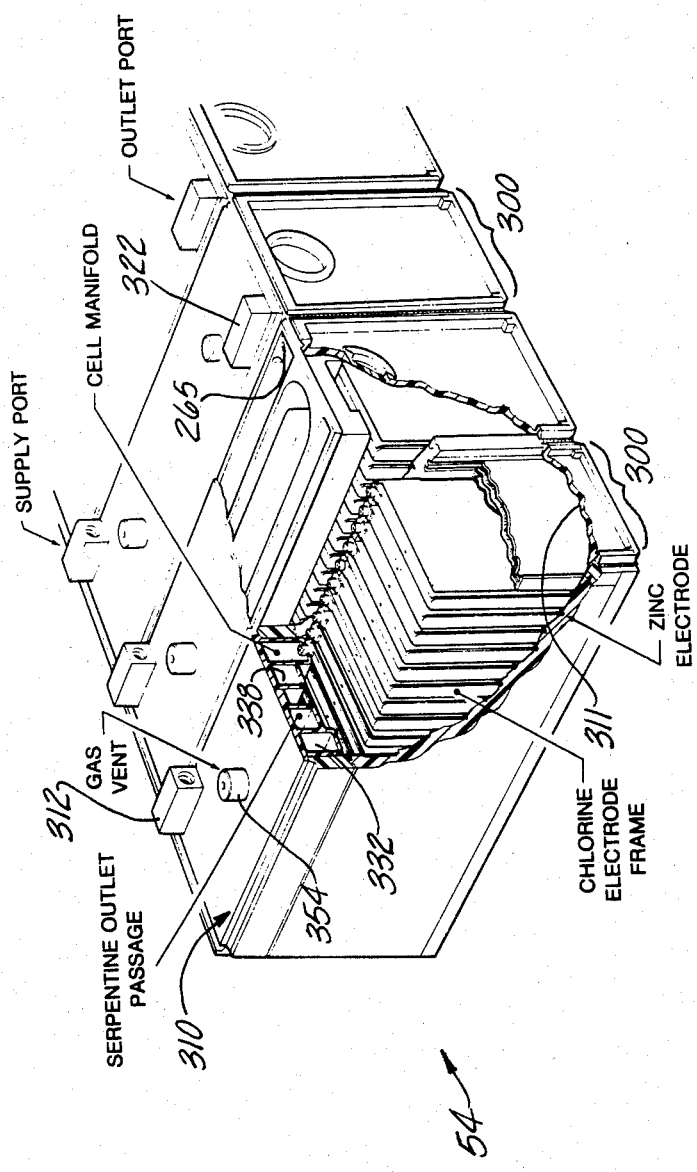
FIG. 12 is a cutaway perspective view of a "closed" submodule for the zinc-chloride battery stack shown in FIGS. 2 and 3.
Figure 13:
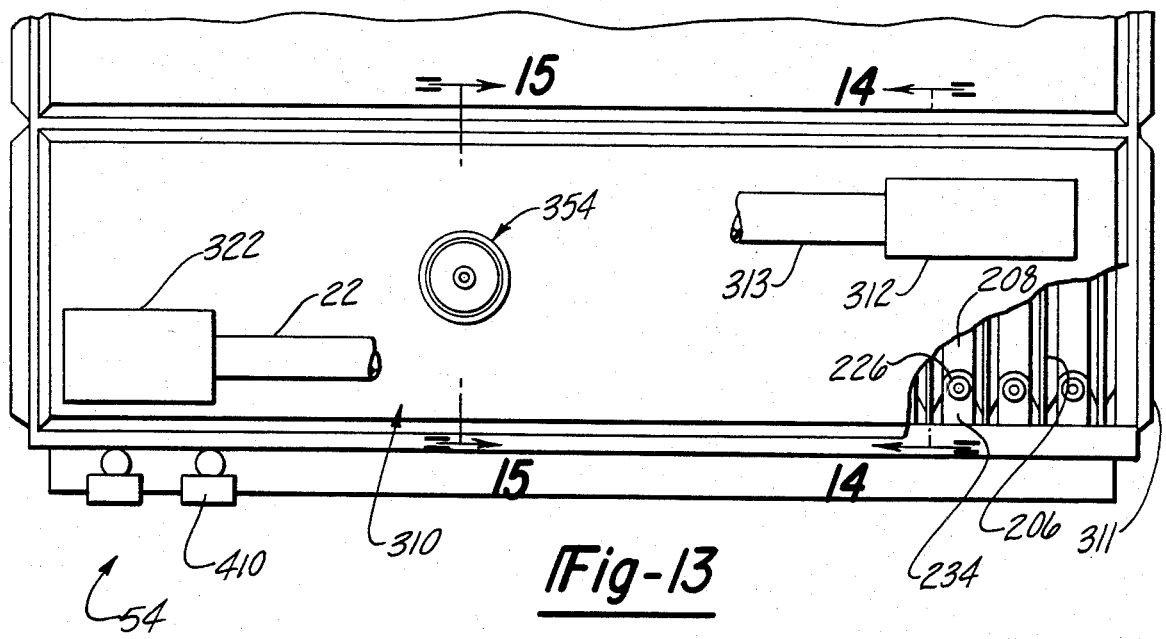
FIG. 13 is a fragmentary top elevation view of the submodule shown in FIG. 12.
Figure 14:
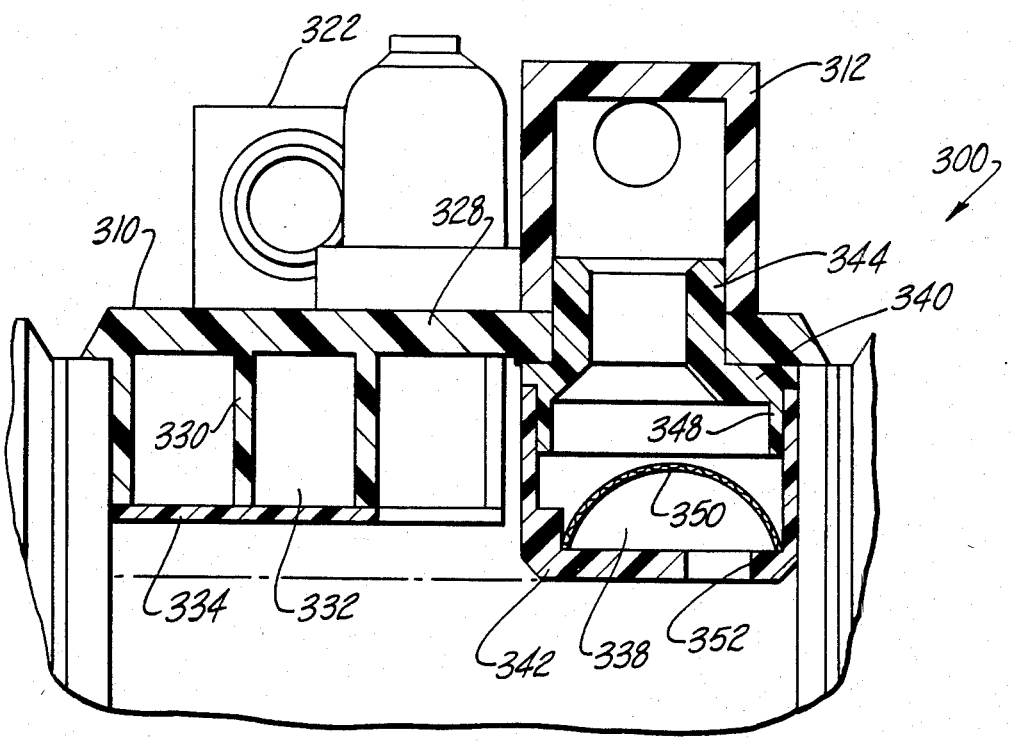
FIG. 14 is a cross-sectional view of the submodule shown in FIG. 13 taken along lines 14—14.

Referring to FIG. 12, a cutaway perspective view of the "closed" submodule 54 for the battery stack 18 of FIGS. 2 and 3 is shown. The construction of the submodule 54 is similar to the submodule 236 of FIG. 10 in several respects. The principal difference between these two submodules is that the submodule 236 is generally open at the top thereof to allow chlorine gas (as well as any other gases) to be liberated from the unit cells; whereas, the submodule 54 is generally closed at the top thereof to control the flow of fluid from unit cells. The submodule 54 is comprised of twenty-four unit cells connected electrically in series. These unit cells are generally designated by reference 300.

Referring additionally to FIGS. 13 through 16, several views of the zinc termination unit cell 300 for the submodule 54 are shown, which particularly illustrate the plastic top section 310 thereof. The top section is welded or otherwise sealably secured to a three sided tray section 311 to form a substantially closed compartment for the unit cell. The top section 310 includes a supply port 312 which is connected to electrolyte distribution tube 88 via a unit cell feed tube 313. A similar electrolyte connection may best be seen with reference to FIG. 3, which shows the supply port 314 of a unit cell 316 of the submodule 52 connected to the electrolyte distribution tube 318 via a feed tube 320.

The top section 310 of the unit cell 300 also includes an outlet port 322 which is connected to the cascade canopy 324 via an outlet tube 326. As may best be seen with respect to FIG. 14, the top section further includes a generally horizontally extending top wall 328 which is integrally formed with a downwardly extending serpentine partition portion 330. The serpentine partition portion 330 is used to form a serpentine-channel discharge manifold 332 in combination with a bottom cover plate 334 which is secured thereto in a generally fluid tight seal. The opening 336 of the discharge manifold permits chlorine gas and electrolyte to flow out of the unit cell 300 as may best be seen with reference to FIG. 16.

The top section 310 of the unit cell 300 additionally includes a unit cell feed manifold 338, which is generally comprised of a top cover 340 and a bottom tray 342 secured thereto in fluid tight relationship. The top cover 340 includes an upper cylindrical portion 344 which is adapted to extend through an orifice in the top wall 328 of the top section 310. The supply port 312 is adapted to slide over and be secured to the cylindrical portion 344. The top cover is also formed with elongated, downwardly extending partition portions 346 and 348 which direct the flow of electrolyte through the manifold 338 in cooperation with the bottom tray 342. Interposed between the top cover 340 and the bottom tray is a screen 350 for filtering the flow of electrolyte to the unit cell 300. The bottom tray 342 is formed with a plurality of holes 352 through which the nipples 226 of electrode frames 208 extend in order to be welded to the bottom tray and permit electrolyte flow to the internal cavities between the chlorine or positive electrodes 202 and 204.

Referring collectively to FIGS. 3, 4, and 9-16, the uniformity of electrolyte distribution amongst all of the individual chlorine electrode pairs contained in electrode assemblies 200 of the battery system 10 may now be explained. As shown in the Figures just mentioned, the electrolyte circulation subsystem 20 of the battery system 10 is comprised of myriad large and small manifolds, serpentines and various size distribution tubes, all of which have been sized to present rather low hydraulic resistance to the amount of electrolyte designed to flow therethrough in comparison to relatively high hydraulic resistance to flow presented by each feed tube 216 (see FIG. 9) in the battery stack 18. On account of the foregoing design, there exists substantially equal hydraulic pressure in all unit cell manifolds 252 (see FIG. 11) and in all serpentine-channel discharge manifolds of each submodule (see FIGS. 12 and 14), if not both submodules 52 and 54. Accordingly, since the differential electrolyte pressure across each feed tube 216 is substantially the same, and since all feed tubes 216 in the battery stack 18 are of the same length and inner diameter, all electrode assemblies 200 in each submodule experience substantially equal flow rates.

Similarly, since the flow capacities of all manifolds and distribution tubes in electrolyte circulation subsystem 20 are relatively large in comparison to the flow rates they experience, the differential hydraulic pressure across any given feed tube 216, and therefore the electrolyte flow rate for the electrode assembly 200 it supplies, remains substantially uniform over time while the battery system 10 is charging or discharging.

Figure 15:
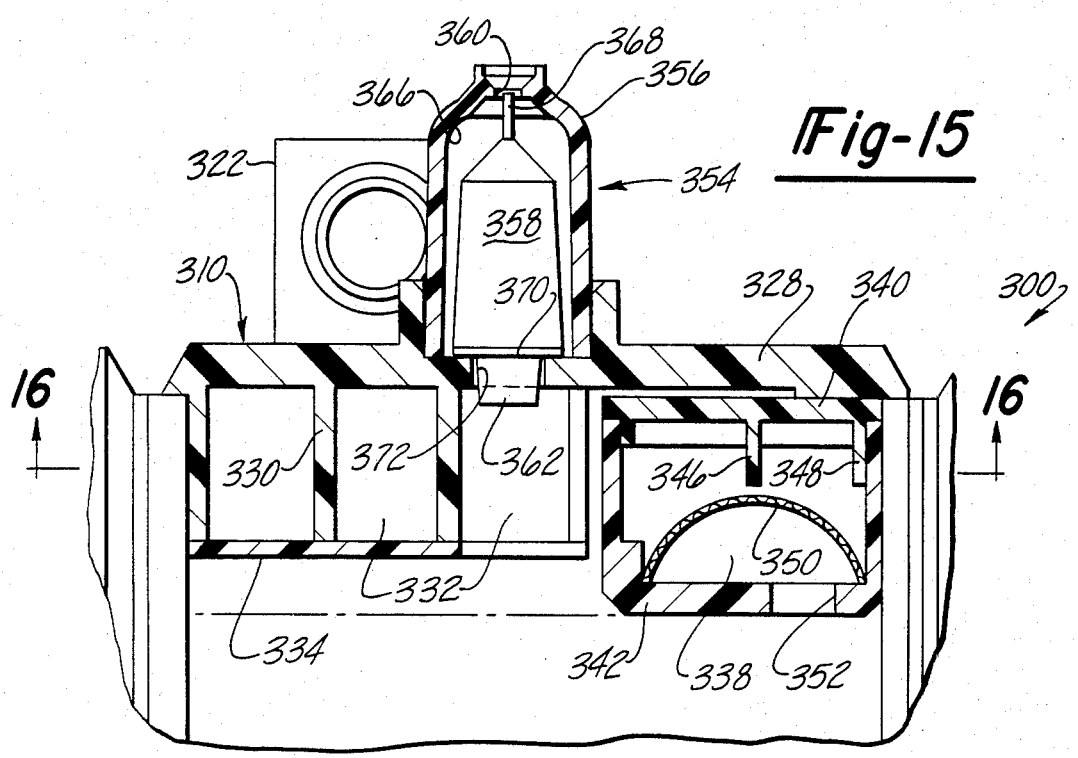
FIG. 15 is a cross-sectional view of the submodule shown in FIG. 13 taken along lines 15—15.
Figure 16:
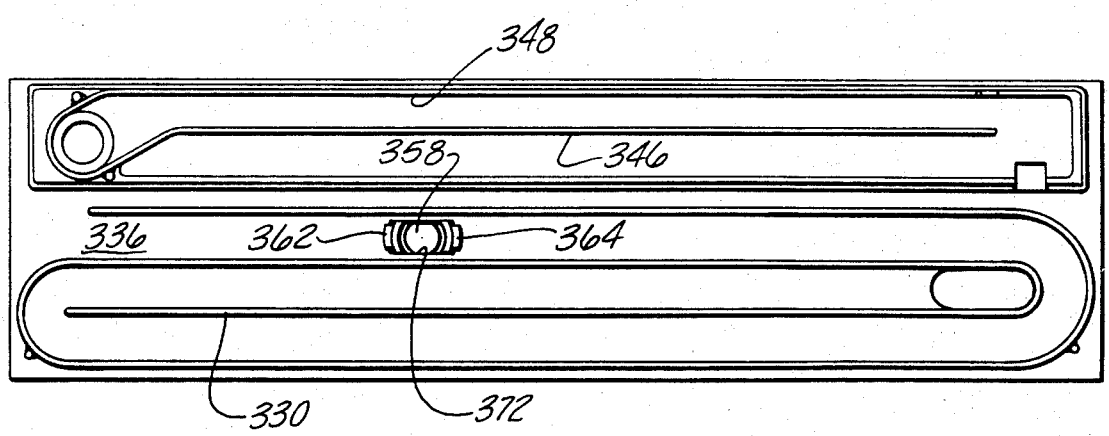
FIG. 16 is a horizontal cross-sectional view of the submodule shown in FIG. 13 taken along lines 16—16.

Referring specifically now to FIG. 15 the unit cell 300 is also shown to include a gas relief valve 354 which is secured to the top wall 328 in a fluid tight relationship. The relief valve 354 is used to selectively vent gas from the interior compartment of the unit cell 300 in response to the electrolyte level in the unit cell. In particular, the relief valve 354 is advantageously used to vent any hydrogen gas which may be present in the unit cell compartment when the battery system 10 is in a charge standby mode.

The relief valve 354 is generally comprised of a conical-shaped housing 356 having a roughly cone-shaped hollow interior 357, and a buoyant float member 358. The housing 356 is formed with an orifice 360 at its top end for venting gas, and the relief valve 354 is formed at its bottom end with a pair of tang members 362 and 364 (which may best be seen in FIG. 16) for mechanically locking the relief valve to the top wall 328 in a snap-fit connection. The float member 358 is shaped to generally conform to the interior surface 366 of the housing 356, so that the float member will block the flow of fluid from the unit cell compartment when the float member is moved upwardly into sealing engagement with the housing by the pressure exerted on the float member by the electrolyte. The float member 358 is also formed with an upwardly extending stem portion 368 for guiding the upward movement of the float member into sealing engagement with the housing 356. Since the float member 358 preferably has a hollow interior, a bottom plate 370 is bonded to the cylindrical portion of the float member in order to trap a quantity of air therein. It should also be noted that while the top wall 328 of the unit cell compartment is provided with an orifice 372 for communicating fluid to the relief valve 354, the orifice is made suitably smaller than the diameter of the float member 358 in order to prevent the float member from dropping into the discharge manifold 332 when the electrolyte level is low. Nevertheless, the orifice 372 must also be suitably shaped so as to permit venting even when the float member 358 has dropped to the point where it is resting upon the top wall 328.

When the electrolyte is being circulated through the battery system 10, such as during the charging or discharging of the battery system, the discharge manifolds 332 for each of the unit cells 300 will become filled with electrolyte and cause the float members 358 to move upwardly to the point were the float members 358 seal the orifices 360. Then, when the battery system is switched to a standby mode, for example at the end of charge or discharge, the electrolyte pump P1 will be turned off and electrolyte circulation will cease. This will cause the electrolyte level in the discharge manifolds 332 to drop to a point sufficient to re-open the orifices 360 by the downward movement of the float members 358. The re-opening at the orifices 360 will permit any gas present in the discharge manifolds 332 or in the gas space between the plates 334 and the tops of the electrode frame members 208 to be vented from the unit cell compartments through the relief valves 354. This automatic venting provision is especially important when the battery system 10 is placed in a standby mode after the battery system has been charged, as it will permit any hydrogen gas evolved at the zinc or negative electrodes 206 during this time to be vented from the unit cell compartments. It should also be noted that the relief valve 354 is designed, through an appropriate choice of size and density for the float member 358, so as to not permit capillary attraction or surface tension of the electrolyte to hold the buoyant float member 358 up in sealing engagement with the housing 356 after electrolyte circulation has ceased.

Referring to FIGS. 3 and 5, these Figures also illustrate a plastic sled 400 which is used to support the submodules 52 and 54 in the lower vessel 14. After the submodules 52 and 54 have been fully assembled with the various electrolyte distribution and collection components described above connected thereto, the sled 400 is then slid into the vessel 14 along an elongated rail 402.

FIG. 3 also illustrates the electrical connections which are made to the submodules 52 and 54. A set of four power terminals 404 are provided such that one power terminal is connected to each end of the submodules 52 and 54. Each of these power terminals comprise a titanium clad copper rod 406 which is friction welded to a titanium bar 408. The titanium bars 408 are attached to the plurality of terminal posts 410 provided at each end of the submodules 52 and 54. Once attached to the submodules 52 and 54, the power terminals 404 are then preferably encased in a plastic (liquid potting resin) envelope that extends outside of the vessel 14. The free ends of the power terminals 404 may then be connected to a suitable D.C. power source for charging the battery system 10 or a suitable load for discharging the battery system.

FIG. 3 also illustrates a glass tube 412 which is used to house a suitable ultraviolet light source, shown in phantom at reference numeral 414. The glass tube 412 is adapted to extend outside of the vessel 14 to facilitate replacement of the ultraviolet light source 414. The ultraviolet light source is adapted to react any hydrogen gas which may be present in the gas space in the vessel 14 with chlorine gas to form hydrogen chloride.

Referring again to FIG. 2, the interaction between the store subsystem 16 of the vessel 12 and the battery stack 18 and electrolyte circulation subsystem 20 of vessel 14 will now be briefly described. When the battery system 10 is in a charge mode, the battery stack 18 will generate a continuous supply of chlorine gas. The chlorine gas will be drawn from the vessel 14 to the vessel 12 by the gas/hydrate pump "P2" via conduit 26. The pump P2 will then mix the chlorine gas with a chilled liquid (preferably water) in the vessel 12 to form chlorine hydrate. When the battery is in a discharge mode, valve "V1" will be opened to permit warm electrolyte from the sump 40 to be pumped through the hydrate decomposition heat exchanger "HX2" located in vessel 12 via conduits 28 and 30. This will cause the hydrate to gradually decompose and liberate a continuous supply of chlorine gas. When the valve "V2" is opened, the chlorine gas being liberated in the vessel 12 will then be transmitted back to the vessel 14 via conduit 24. This supply of chlorine gas is then injected into the electrolyte circulation subsystem 20 where the gas is dissolved in the electrolyte which is being distributed to the battery stack 18. At the end of discharge, all of the chlorine hydrate will have been decomposed and the chlorine gas returned and consumed in the battery stack 18.

Figure 17:
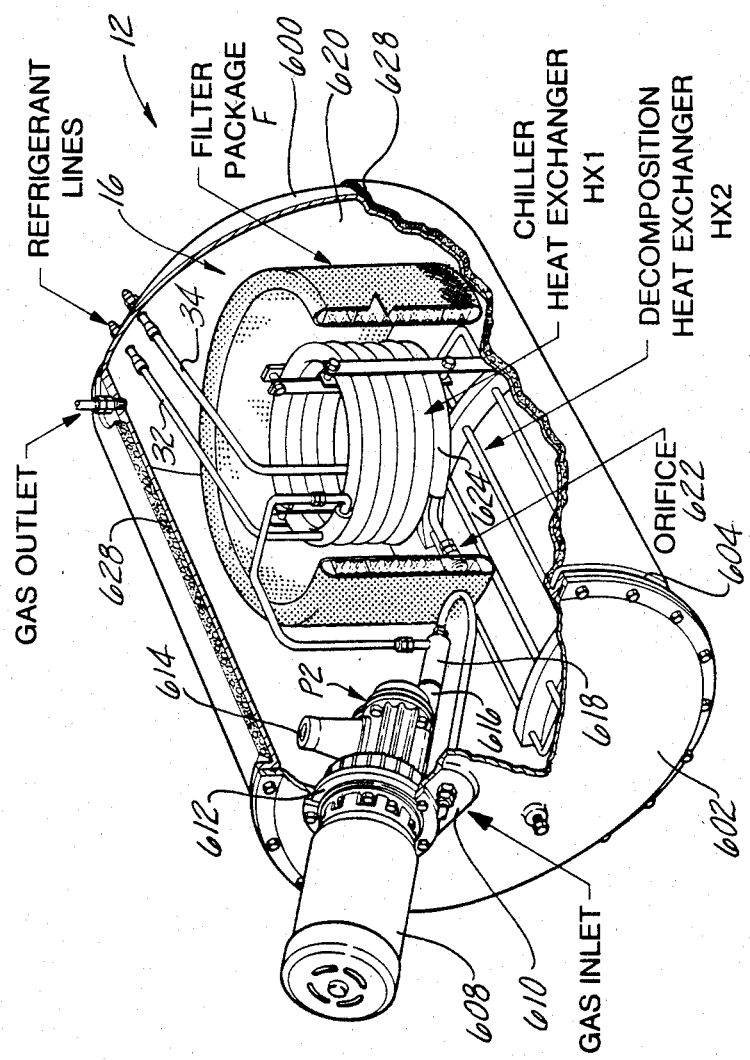
FIG. 17 is a cutaway perspective view of a store subsystem employing a conventional decomposition heat exchanger.

FIG. 17 is a cutaway perspective view showing the equipment arrangement inside the store subsystem 16 depicted in FIGS. 1 and 2. Store 16 is contained within a short cylindrical case or vessel 12 and is preferably mounted above the stack vessel 14 as shown in FIG. 1. Vessel 12 has an integral domed end 600 and is closed with a domed cover 602 at the other end which is bolted to flange 604. In operation, vessel 12 is filled almost entirely with liquid (preferably water), leaving a relatively small gas space 605 best shown by liquid level line 606 in FIG. 2.

Components located within or on the store vessel 12 include gas/hydrate pump P2, filter package F, pressure control orifice 622, hydrate former heat exchanger HX1, and decomposition heat exchanger HX2. Various features and operating characteristics of these components may now be described.

Gas/hydrate pump P2 with its electric driving motor 608 attached is mounted on boss 610 of domed cover 602. Pump P2 is of "plug-in" style construction with the motor armature magnetically-coupled to the pump shaft through a plastic pump cover 612, so that no motor or pump shaft projects through the wall of store vessel 12. The pump P2 is an external or spur gear type pump manufactured by Ingersoll-Rand and built with plastic gears and housings and graphite bushings.

Pump P2 discharges through conical nozzle 614 directly into the gas space 605 at the top of vessel 12. Suction portion 616 of pump P2 plugs or couples directly into inlet fitting or coupling 618 rigidly mounted within the vessel 12. Gas from battery stack 18 provided via conduit 26 and liquid from the store 16 are fed into pump P2 through coupling 618. Chilled liquid (preferably water) is drawn through the coiled tube-in-tube heat exchanger HX1 from the liquid or water reservoir 620 of vessel 12.

In order that hydrate crystals, also slurried in water reservoir 620, not be drawn through heat exchanger HX1 and pump P2, a separation leaf-type filter package "F" is employed. Filter F is configured as a double-walled cylinder and submerged in water reservoir 620. Filter F is constructed of a heavy-gauge PVC mesh on a rigid ring-like plastic frame, and covered with a sleeve of Teflon-felted cloth, which effectively prevents any hydrate crystals from entering the space between the cylinder walls of filter F.

Water enters heat exchanger HX1 from the space between the cylinder walls of filter F through an orifice 622 sized to allow the desired liquid flow rate and maintain the internal pressure within heat exchanger HX1 at approximately suction pressure of pump P2, which is preferably about 11 psia.

Heat exchanger HX1, as shown in a number of the accompanying drawings, is a simple tube-in-tube assembly, which preferably consists of two concentric titanium tubes rolled to form a coil 624 as shown in FIG. 17. High-flux coating, commercially available from Union Carbide Corporation, is preferably deposited on the outer surface of the inner tube to drastically reduce the superheat required for refrigerant boiling by promoting nucleate boiling, thus effectively increasing the heat transfer coefficient from two to ten-fold. Use of such a coating allows heat exchanger HX1 to be made more compact than otherwise would be possible.

Refrigerant used in heat exchanger HX1 is preferably Freon 12, and is provided through refrigerant supply and return lines 32 and 34, which are shown passing through the domed end 600 of store vessel 12 by way of pressure-tight sealed bushings. As shown in FIGS. 2 and 17, refrigerant flows through the annulus portion of coil 624 of heat exchanger HX1, while the store liquid flows through the inner tube of coil 624.

The equipment packaged inside store vessel 12 is preferably mounted on a self-locating support frame or sled (not shown) contoured to rest upon the curved inner surface of the vessel. Such a support frame allows heat exchangers HX1 and HX2, package filter F, pressure control orifice 622, and the pump inlet coupling 618 to be erected outside of store vessel 12 so that they may be slipped inside as a complete assembly. The equipment packaged inside the store vessel 12 can then be held stationary with respect to store vessel 12 by various attachments of the equipment to the store vessel 12 such as the bushings for the two refrigerant lines 32 and 34 and the two bushings for lines 28 and 30 going to heat exchanger HX2 (see FIGS. 2 and 19). By utilizing such a support frame and system of attachment points, no assembly work need be accomplished inside of the store vessel 12.

Figure 19:
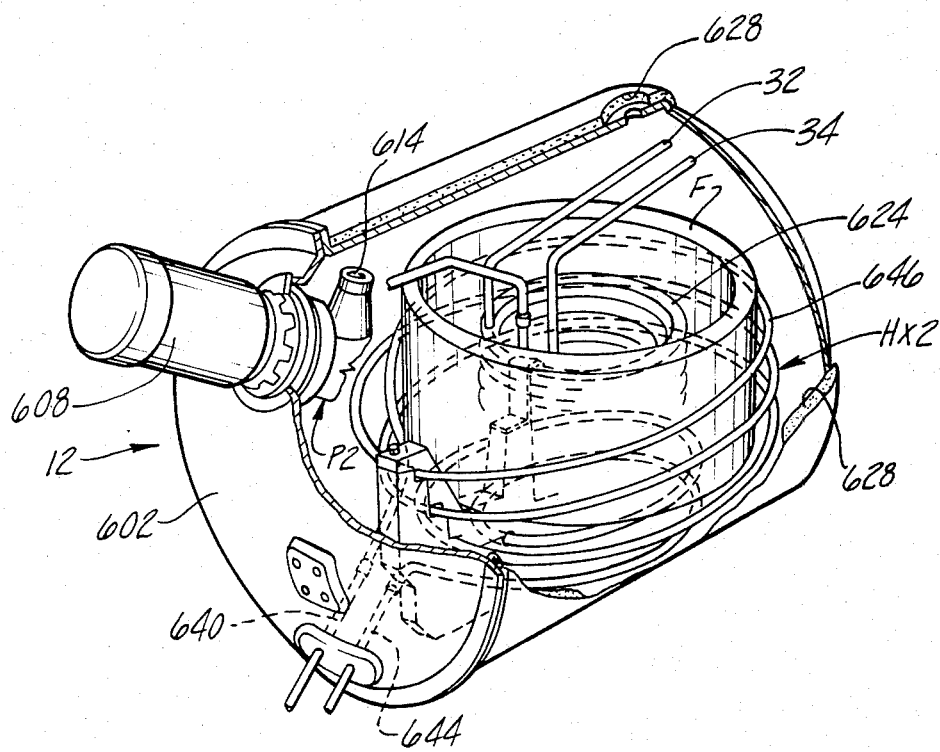
FIG. 19 is a cutaway perspective view of the store subsystem for the battery system shown in FIGS. 1 and 2.
Figure 20:
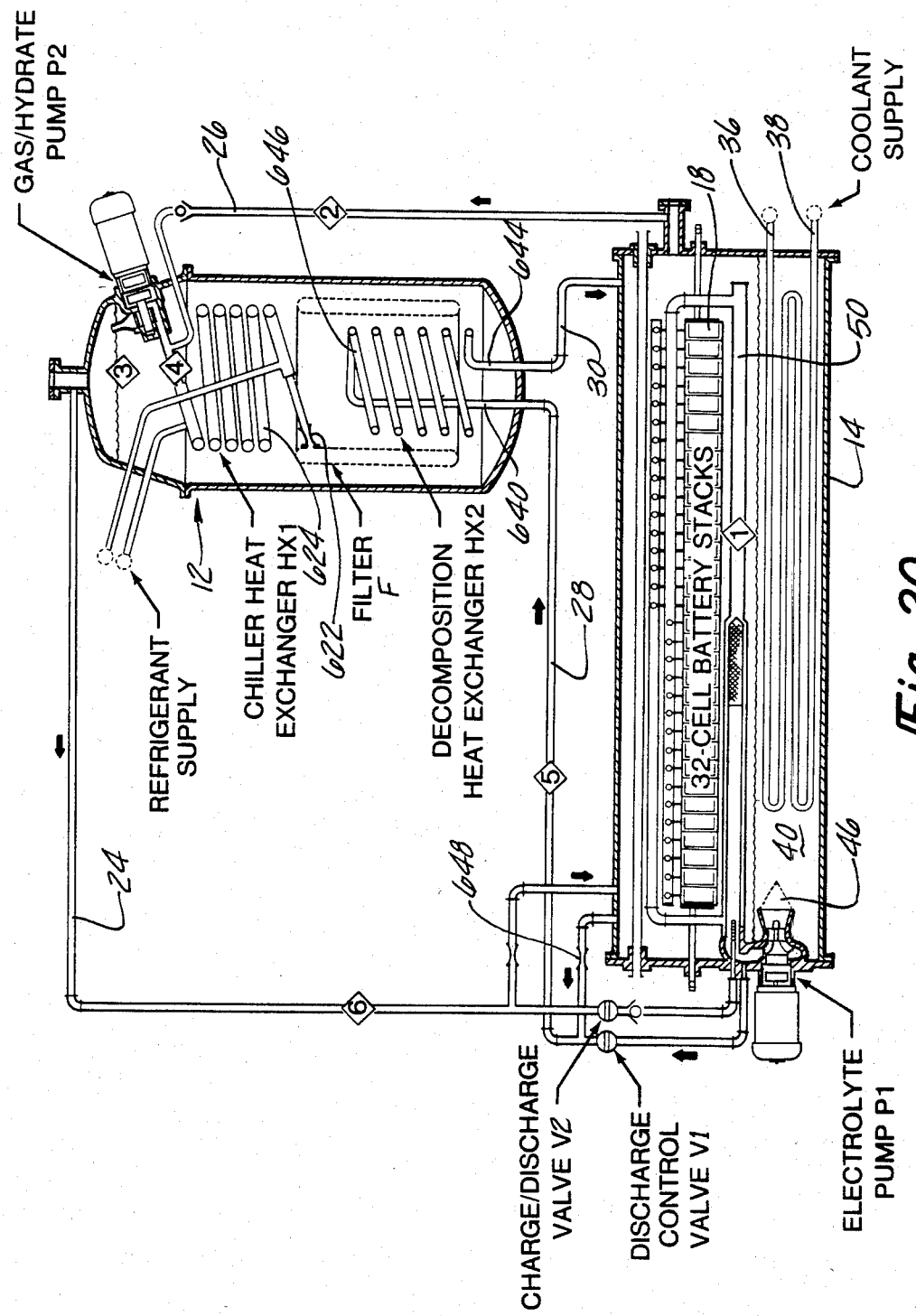
FIG. 20 is an alternative embodiment of a zinc-chloride battery system according to the present invention.

The various configurations of decomposition heat exchangers HX2 shown in FIGS. 17, 19 and 20 are formed by bending a length of tubing (preferably $\frac{1}{2}$ or $\frac{5}{8}$ inch O.D. titanium tubing) into the desired shape or pattern. For reasons which will be shortly explained in detail, the coil pattern selected for the heat exchanger HX2 should allow electrolyte to drain from the heat exchanger HX2 when not in use. FIGS. 19 and 20 show two preferred coil patterns for heat exchanger HX2 designed to ensure such proper drainage. Experience has shown, for example, that even the generally horizontal coil pattern for heat exchanger HX2 shown in FIG. 17 does not effectively provide complete drainage of electrolyte from heat exchanger HX2.

As mentioned earlier, the store vessel 12 itself is preferably made from FRP with a PVC liner bonded thereto. Since the temperature within store vessel 12 is preferably maintained at approximately ten degrees C., which may be below ambient temperatures typically encountered in indoor installations of the battery system, thermal insulation is preferably placed about much of the external surfaces of the store vessel to improve the overall system energy efficiency. In a preferred embodiment, a one and one-half inch layer of urethane foam designated by the numeral 628 covers approximately eighty percent of the exterior of vessel 12, and the foam in turn may be covered by a thin one-eighth inch of FRP lay-up to protect it from damage.

In the battery system 10 of the present invention, a preferred electrolyte is a two molar concentration of zinc-chloride (measured when the battery system 10 is fully-discharged), having supporting (i.e., conductivity-improving) salts of about a four molar concentration of potassium chloride and about a one molar concentration of sodium chloride to increase overall battery system efficiency.

During the normal operation of the battery system 10, the electrolyte temperature in stack vessel 14 preferably maintained between about thirty and forty degrees C. Warm electrolyte from sump 40 continuously circulating through heat exchanger HX2 typically is not cooled during its passage through heat exchanger HX2 more than ten degrees C., and thus, precipitation of supporting salts in the electrolyte does not normally occur at the time. However, whenever heat exchanger HX2 is turned off long enough for the electrolyte within the heat exchanger to cool to near the internal temperature maintained within the store, precipitation of supporting salts and the resultant clogging of decomposition heat exchanger HX2 would be a major problem if the highly salted electrolyte were allowed to remain in this heat exchanger as the less highly salted electrolytes were allowed to do in earlier zinc-chloride battery systems.

To eliminate such problems, the zinc-chloride battery systems shown in the prior art have been redesigned so that the decomposition heat exchanger HX2 is now self-draining during those periods of time when no flow of electrolyte is required therethrough. To do this without adding any appreciable additional cost, complexity, or control equipment (such as a control valve and/or pump) to the battery system, the battery system 10 is now designed so that heat exchanger HX2 of the store subsystem 16 is located higher than the sump 40 associated with the battery stack 18, so that electrolyte will drain from heat exchanger HX2 back to the sump 40 when electrolyte flow therethrough is not required. This is preferably accomplished by placing store vessel 12 completely above stack vessel 14 as shown in the latest battery system designs in FIGS. 1, 2 and 20.

Figure 18:
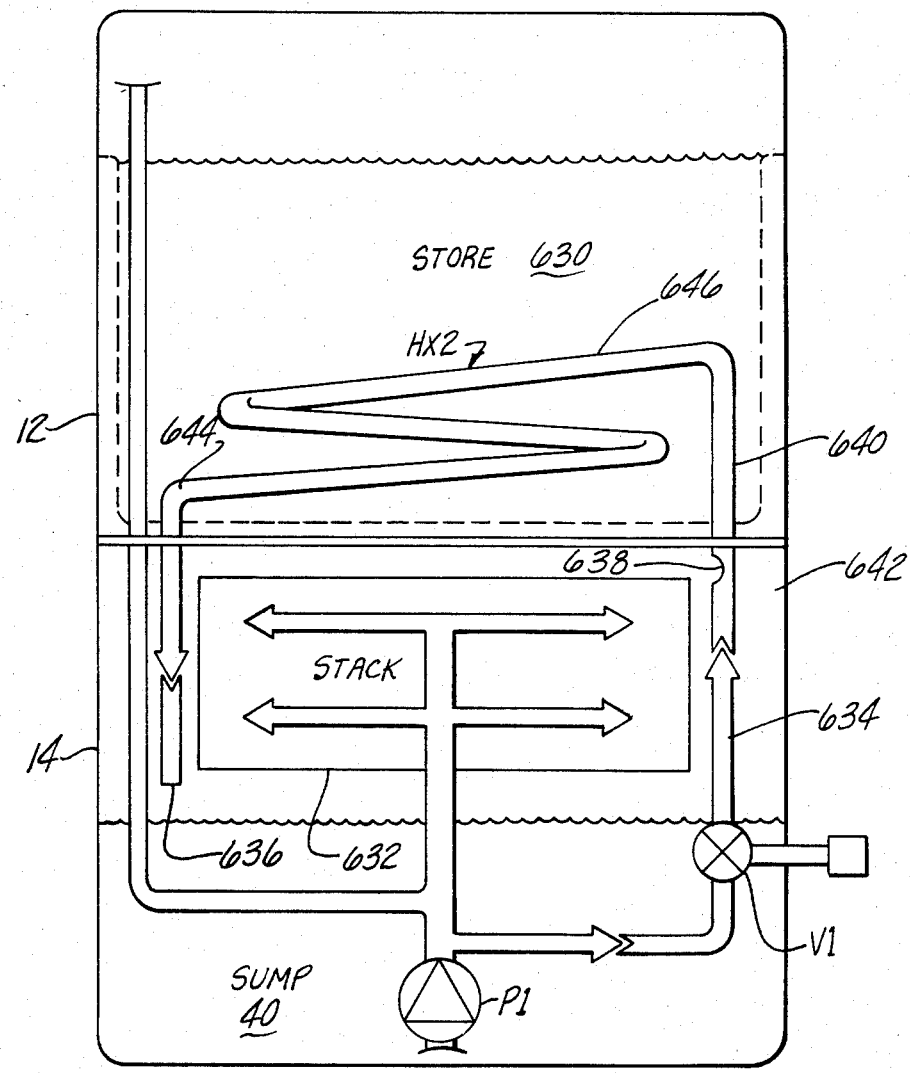
FIG. 18 is a schematic diagram of a self draining heat decomposition heat exchanger for a zinc-chloride battery system.

FIG. 18 is a schematic diagram of the self-draining heat exchanger concept with the store 630 elevated above the level of electrolyte in the sump 40. As can be seen by referring to FIG. 18, electrolyte pump P1 provides electrolyte to the stack 632. During the discharge mode of the zinc-chloride battery cycle, pump P1 also provides electrolyte to heat exchanger HX2 through conduit 634 by opening decomposition control valve V1, which is normally closed during all other times of the battery cycle. The rate at which heat is provided to the liquid in store 630 by heat exchanger HX2 determines the rate at which chlorine is liberated by the decomposition of chlorine hydrate in the store. Control valve V1 may be intermittently opened and closed during the discharge mode to modulate this heat transfer rate. When the flow of electrolyte is blocked by control valve V1, electrolyte in heat exchanger HX2 drains into sump 40 through conduit 636. Those skilled in the art will appreciate that if heat exchanger HX2 is higher than sump 40 and is provided with sufficient slope and its tubing is of sufficient inner diameter, electrolyte will naturally drain therefrom, especially since the aqueous electrolyte used in zinc-chloride battery systems has a consistency very much like plain water. However, to promote much faster drainage of the relatively small diameter tubing normally used in heat exchanger HX2, a vent means 638 has been added between the outlet of pump P1 and the inlet 640 of heat exchanger HX2 to allow gas to enter heat exchanger HX2 to replace electrolyte as it drains therefrom. The gas is preferably drawn, as shown in FIG. 18, from the gas space 642 of stack vessel 14. In battery systems employing a decomposition control valve V1 located basically as shown in FIG. 18, vent 638 must be placed downstream from the control valve V1.

Vent means 638 in the preferred embodiment of the zinc-chloride battery system of the present invention is a 1/16 inch diameter hole in conduit 634, and is connected to gas space 642 in stack vessel 14. Those skilled in the art will appreciate that a larger or smaller size hole could be used for the vent 638. While a 1/32 inch hole could be used for example, a 1/16 inch hole is deemed preferable since it is deemed less susceptible to clogging by any small particulate or foreign matter which might possibly be present in the electrolyte. An advantage of a small hole, such as a 1/16 inch diameter hole, over a considerably large hole such as a 5/16 inch diameter hole, is that its liquid volumetric capacity is insignificant in comparison to the flow of electrolyte through the heat exchanger, so that any electrolyte flow through vent 638 back to the sump 40 represents a negligible energy loss to the battery system. Yet, the gaseous volumetric capacity of the vent 638 for such a small hole is sufficiently large to ensure fairly rapid drainage of the electrolyte from heat exchanger HX2 before the electrolyte therein cools sufficiently to allow any significant precipitation of conductivity-improving salts.

FIGS. 18, 19 and 20 show that a heat exchanger HX2 of the self-draining type is preferably constructed of three parts: an inlet portion 640, an outlet portion 644, and a generally helical central portion 646 disposed between the inlet and outlet portions. Central portion 646 preferably slopes substantially continuously downward from the inlet portion 640 to the outlet portion 644 in order to prevent any electrolyte from remaining in the central portion of heat exchanger HX2 when the electrolyte is to be drained therefrom. The angle of the slope may be varied so long as it is sufficient both to prevent electrolyte from remaining within heat exchanger HX2, and to allow relatively quick drainage of the electrolyte before it cools sufficiently to allow any significant precipitation. The optimal slope and configuration of heat exchanger HX2 is dependent upon the room available therefor in store vessel 12, the size and length of the tubing used therefor, the length of the conduit inter connections between the heat exchanger and the sump 40 and electrolyte pump P1, and the size of the hole or orifice for the vent 638. Variations in all of these design details are within the contemplated scope of the invention.

Vent means 638, rather than being continuously open to the gas space as is shown in FIG. 18, could alternatively be opened and closed as needed through the use of a control valve. A simple hole in conduit 634 is deemed preferable to using control valve approach to venting since such a vent hole is less costly, simpler, and inherently automatic in operation.

As can be seen in FIG. 18, some electrolyte may remain in conduit 634 between decomposition control valve V1 and vent 638. Because conduit 634 is outside of store vessel 12, and is therefore subject to much higher ambient temperatures, precipitation of salt therein is not a problem.

Another benefit of the basic self-draining heat exchanger arrangement shown in FIG. 18 is that it takes full advantage of the natural momentum of the electrolyte flowing through the heat exchanger HX2 to help promote rapid draining of heat exchanger HX2.

FIGS. 1 and 2 show a preferred embodiment of vent 638 and piping therefor. Specifically, decomposition control valve V1 and vent 638, which is shown schematically in FIG. 2 as orifice 648, are located exterior to both store and stack vessels 12 and 14. The exterior location of conduit 24, 26, 28 and 30, valves V1 and V2, and vent 638, as well as other equipment shown in FIGS. 1 and 2, facilitates trouble-shooting, maintenance and repair of these items. FIGS. 19 and 20 each illustrate a preferred embodiment of an overall lay-out and coil pattern for a self-draining heat exchanger HX2. Tests of self-draining heat exchanger HX2 arrangement described above with respect to FIG. 18 have shown it to be very effective in preventing precipitation of salts in heat exchanger HX2 and the clogging problem resulting therefrom.

FIG. 20 shows an alternative embodiment of the store subsystem that is being designed for large commercial installations such as electrical utility load-leveling applications. The principles of operation and construction techniques of the battery system shown in FIG. 20 are basically the same as those shown for the battery system of FIG. 1. The upright position of store vessel 12 in FIG. 20, in conjunction with the reduction of the diameter of the store vessel to match the diameter of the stack vessel 14, provides a considerably more compact stacking arrangement for multiple battery systems used in large applications like a commercial load-leveling battery plant. One such compact stacking arrangement, which beneficially provides a rather high battery system density per unit volume, is shown in FIG. 21. To provide for an increased energy capacity, each individual battery system shown in FIG. 20 has its battery stack 18 within the stack vessel 14 increased from 72 inches (as shown in the battery stack of FIG. 2) to 92 inches. Similarly, other components such as the three heat exchangers HX1, HX2 and HX3 are increased in size to accommodate the increased energy capacity.

While it will be appreciated that the preferred embodiments of the invention disclosed are well calculated to fulfill the objects above stated, it will be appreciated that the invention is susceptible to modification, variation and damage without departing from the proper scope or fair meaning of the subjoined claims.

I claim:

1. In a zinc-chloride battery having a plurality of electrically connected cells from which hydrogen gas is generated when a zinc deposit is present on the negative electrodes of said cells and an aqueous zinc-chloride electrolyte is in communication with said cells, and means for circulating said electrolyte through said cells, the improvement comprising:

means for defining a substantially closed compartment in said battery for containing said cells and at least a portion of said electrolyte; and means in association with said compartment means for selectively venting said hydrogen gas from the interior of said compartment means in response to the level of said electrolyte within said compartment means.

2. The invention according to claim 1 wherein said venting means includes a relief valve having a float member which is activated in response to the level of said electrolyte within said compartment means.

3. The invention according to claim 2, wherein said float member closes said relief valve to prevent the venting of said gas when the level of said electrolyte is above a predetermined level, and said float member opens said relief valve to allow the venting of said gas when the level of said electrolyte is below said predetermined level.

4. An improved metal-halogen battery system comprising:

a plurality of electrically connectable cells, each having positive and negative electrodes separable by an aqueous electrolyte containing metal and halogen and operable to generate hydrogen gas;

means for channeling flowing electrolyte through said cells;

a substantially closed compartment containing said cells and adapted to contain at least a portion of said electrolyte, said compartment having a top section; and a gas relief valve rigidly attached to said top section for venting hydrogen gas from said compartment when the level of electrolyte therein falls below a predetermined level.

5. The invention according to claim 4 wherein said gas relief valve comprises:

a housing rigidly attached to and partially projecting through said top section having a hollow interior and an orifice thereabove interconnected to said hollow interior, and buoyant float member shaped to generally conform to said hollow interior, positioned therein, and movable in response to the level of said electrolyte between an upward position wherein said float member is sealingly engaged with said housing interior to block said orifice, and a downward position wherein said orifice is in fluid communication with said compartment to vent hydrogen gas therefrom.

6. The invention according to claim 5 wherein said float member has a generally conical shape and is provided with an upwardly extending stem portion partially projecting into said orifice.

7. In an electrochemical system having at least one cell from which a gas is generated and an electrolyte communicating with said cell, the improvement comprising:

means for defining a substantially closed compartment for containing said cell and at least a portion of said electrolyte;

vent means communicating with said compartment for venting said gas; and valve means movable in response to the level of said electrolyte within said compartment between a resting position, permitting the venting of generated gas through said vent means, and a floating vent closing position, preventing said electrolyte from escaping through said vent means wherein said compartment means includes electrolyte outlet manifold means and said vent means communicates with said outlet manifold means.

8. The improvement according to claim 7 wherein said outlet manifold means comprises serpentine passage means having inlet means communicating with said compartment means and an outlet means.

9. The improvement according to claim 8 wherein said vent means communicates with said serpentine passage means and is disposed nearer the inlet of said serpentine passage means than the outlet thereof.

* * * * *